United States Patent
Kutomi et al.

(10) Patent No.: US 8,447,790 B2
(45) Date of Patent: May 21, 2013

(54) ELECTRIC DEVICE FOR EXECUTING PROCESS BASED ON MAP DATA

(75) Inventors: Shinji Kutomi, Ichinomiya (JP); Takayuki Matsunaga, Hachioji (JP)

(73) Assignee: DENSO CORPORATION, Kariya (JP)

(*) Notice: Subject to any disclaimer, the term of this patent is extended or adjusted under 35 U.S.C. 154(b) by 214 days.

(21) Appl. No.: 13/013,865

(22) Filed: Jan. 26, 2011

(65) Prior Publication Data
US 2011/0191387 A1  Aug. 4, 2011

(30) Foreign Application Priority Data

Jan. 29, 2010 (JP) .................................. 2010-19095
Nov. 8, 2010 (JP) ................................ 2010-249783

(51) Int. Cl.
*G06F 7/00* (2006.01)
*G06F 17/30* (2006.01)

(52) U.S. Cl.
USPC ........................................................ 707/803

(58) Field of Classification Search
None
See application file for complete search history.

(56) References Cited

U.S. PATENT DOCUMENTS 5,614,895 A * 3/1997 Ohomori et al. ......... 340/995.15
6,430,499 B1 8/2002 Nakano et al.
6,462,676 B1 * 10/2002 Koizumi .................... 340/995.1
7,403,852 B2 7/2008 Mikuriya et al.
7,526,492 B2 4/2009 Mikuriya et al.
7,877,203 B2 1/2011 Mikuriya et al.
2008/0243368 A1 10/2008 Kuroda
2010/0023554 A1 1/2010 Fujimoto et al.
2011/0246063 A1 * 10/2011 Nakamura .................... 701/201

FOREIGN PATENT DOCUMENTS

| JP | A-2004-028846 | 1/2004 |
| JP | A-2010-071767 | 4/2010 |
| JP | A-2010-117273 | 5/2010 |
| JP | A-2010-164979 | 7/2010 |

OTHER PUBLICATIONS

H. Fujimoto, "World Wide Vehicle Navigation System Using KIWI Format," *DENSO Technical Review*, vol. 6, No. 1, ppp. 299-34 (2001) (English abstract enclosed; discussed on p. 1 of the Specification).
Office Action dated Aug. 9, 2012, in corresponding CN patent application No. 201110035002.0.

* cited by examiner

*Primary Examiner* — Uyen Le
(74) *Attorney, Agent, or Firm* — Posz Law Group, PLC

(57) ABSTRACT

An electric device for executing a process based on a map data includes: a map data memory; a work memory; and a CPU for developing a map data from the map data memory into the work memory. The CPU executes the process based on the developed map data. The map data provides a road network defined by unit links and link connection relationships, and includes an attribution data in each link. The CPU generates a node table according to the attribution data. The node table stores a link connection information in each node as the connection point coupled with links. The link connection information provides identification of the links coupled with each other at a corresponding node. The CPU writes the node table as the developed map data into the work memory.

9 Claims, 17 Drawing Sheets

FIG. 2

[INTEGRATED FILE]

| NUMBER A0 OF INTEGRATED MESH DATA IN 0TH LEVEL |
| NUMBER A1 OF INTEGRATED MESH DATA IN 1ST LEVEL |
| ... |
| NUMBER AX OF INTEGRATED MESH DATA IN X-TH LEVEL |

La1

| OFFSET TO INTEGRATE MESH DATA 1 IN 0TH LEVEL |
| OFFSET TO INTEGRATE MESH DATA 2 IN 0TH LEVEL |
| ... |
| OFFSET TO INTEGRATE MESH DATA (A0-1) IN 0TH LEVEL |
| OFFSET TO INTEGRATE MESH DATA A0 IN 0TH LEVEL |
| OFFSET TO INTEGRATE MESH DATA 1 IN 1ST LEVEL |
| ... |
| OFFSET TO INTEGRATE MESH DATA A1 IN 1ST LEVEL |
| ... |
| OFFSET TO INTEGRATE MESH DATA 1 IN X-TH LEVEL |
| ... |
| OFFSET TO INTEGRATE MESH DATA AX IN X-TH LEVEL |

La2

| INTEGRATED MESH DATA 1 IN 0TH LEVEL |
| INTEGRATED MESH DATA 2 IN 0TH LEVEL |
| ... |
| INTEGRATED MESH DATA (A0-1) IN 0TH LEVEL |
| INTEGRATED MESH DATA A0 IN 0TH LEVEL |
| INTEGRATED MESH DATA 1 IN 1ST LEVEL |
| ... |
| INTEGRATED MESH DATA A1 IN 1ST LEVEL |
| ... |
| INTEGRATED MESH DATA 1 IN X-TH LEVEL |
| ... |
| INTEGRATED MESH DATA AX IN X-TH LEVEL |

La3

[INTEGRATED MESH DATA]

| SIZE OF INTEGRATED MESH DATA |
| NUMBER OF MESHES |
| OFFSET OF MESH UNIT DATA 1 |
| OFFSET OF MESH UNIT DATA 2 |
| ... |
| OFFSET OF MESH UNIT DATA (M-1) |
| OFFSET OF MESH UNIT DATA M |

La4

| MESH UNIT DATA 1 |
| MESH UNIT DATA 2 |
| ... |
| MESH UNIT DATA (M-1) |
| MESH UNIT DATA M |

LINK RECORD
(DEFINED BY FIXED LENGTH)

| |
|---|
| TYPE OF LINK |
| LINK LENGTH |
| NUMBER OF TRAFFIC LANES |
| NUMBER OF COORDINATE POINTS FROM STARTING TO ENDING IN LINK (INCLUDING SHAPE INTERPOLATION POINT AND NODE) |
| SPEED CATEGORY |
| FLAG FOR EXISTENCE OF SPEED LIMIT INFORMATION |
| LINK DIRECTION ATTRIBUTION (BOTH WAYS AVAILABLE / FORWARD WAY AVAILABLE / REVERSE WAY AVAILABLE / NO THROUGH ROAD) |
| FLAG FOR EXISTENCE OF COMBINED LINK CONTROL INFORMATION ON STARTING SIDE |
| FLAG FOR EXISTENCE OF COMBINED LINK CONTROL INFORMATION ON ENDING SIDE |
| FLAG FOR EXISTENCE OF TRAFFIC SIGNAL ON STARTING SIDE OF LINK |
| FLAG FOR EXISTENCE OF TRAFFIC SIGNAL ON ENDING SIDE OF LINK |
| FLAG FOR EXISTENCE OF UPPER LEVEL NODE WITH RESPECT TO STARTING SIDE NODE OF LINK |
| FLAG FOR EXISTENCE OF UPPER LEVEL NODE WITH RESPECT TO ENDING SIDE NODE OF LINK |
| LINK NUMBER OF LINK CONNECTING TO STARTING POINT (LINK NUMBER OF LINK CONNECTING TO STARTING POINT OF SUBJECT LINK OR, LINK NUMBER OF SUBJECT LINK WHEN THERE IS NO LINK CONNECTING TO STARTING POINT) |
| CONNECTION ATTRIBUTION OF STARTING POINT (CONNECTING TO STARTING POINT OF OBJECT LINK OR CONNECTING TO ENDING POINT OF OBJECT LINK) |
| LINK NUMBER OF LINK CONNECTING TO ENDING POINT (LINK NUMBER OF LINK CONNECTING TO ENDING POINT OF SUBJECT LINK OR, LINK NUMBER OF SUBJECT LINK WHEN THERE IS NO LINK CONNECTING TO ENDING POINT) |
| CONNECTION ATTRIBUTION OF ENDING POINT (CONNECTING TO STARTING POINT OF OBJECT LINK OR CONNECTING TO ENDING POINT OF OBJECT LINK) |
| ... |

FIG. 4B

COORDINATE RECORD
(DEFINED BY FIXED LENGTH)

| |
|---|
| TYPE OF COORDINATE (SHAPE INTERPOLATION POINT, NODE, BOUNDARY NODE AND SO ON) |
| IDENTIFICATION INFORMATION OF ADJACENT MESH CONNECTING TO BOUNDARY NODE (ONLY BOUNDARY NODE AVAILABLE) |
| X COORDINATE |
| Y COORDINATE |
| ... |

FIG. 7A

LINK L1

| STARTING (OR ENDING) POINT CONNECTION LINK NUMBER | LINK NUMBER OF LINK L2 |

LINK L2

| STARTING (OR ENDING) POINT CONNECTION LINK NUMBER | LINK NUMBER OF LINK L3 |

LINK L3

| STARTING (OR ENDING) POINT CONNECTION LINK NUMBER | LINK NUMBER OF LINK L0 |

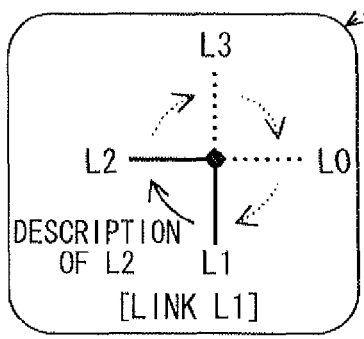
[LINK L1]

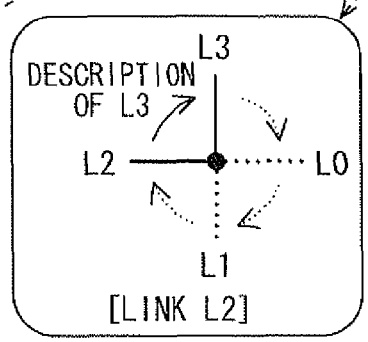
[LINK L2]

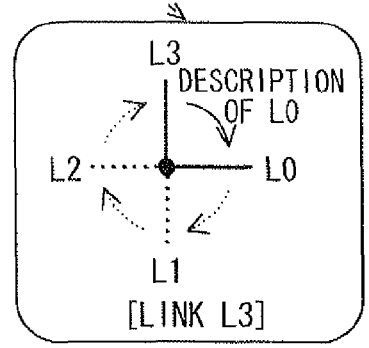
[LINK L3]

FIG. 7B

LINK R1

| STARTING (OR ENDING) POINT CONNECTION LINK NUMBER | LINK NUMBER OF LINK R2 |

LINK R2

| STARTING (OR ENDING) POINT CONNECTION LINK NUMBER | LINK NUMBER OF LINK L0 |

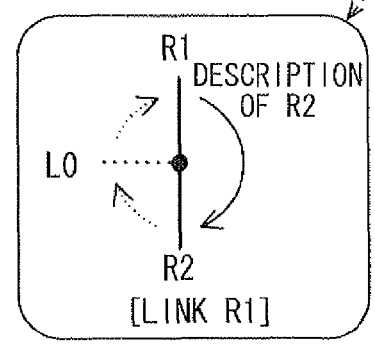
[LINK R1]

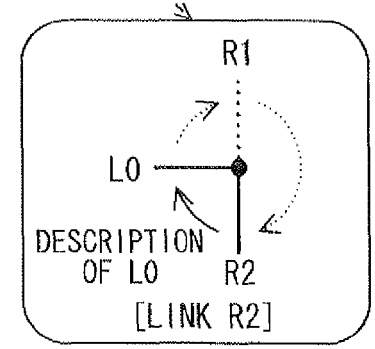
[LINK R2]

FIG. 12A

[ROUTE SEARCH LINK TABLE]

TBL13

| LINK NUMBER | DETAIL ATTRIBUTION OF LINK ||||  |
|---|---|---|---|---|---|
| | TYPE OF LINK | LINK LENGTH | SPEED LIMIT | ONE WAY REGULATION | ... |
| 61002 | STATE ROAD | 37 | 40 | NO LIMIT | ... |
| 61353 | INTERSTATE ROAD | 41 | 50 | NO LIMIT | ... |
| 61354 | INTERSTATE ROAD | 52 | 50 | NO LIMIT | ... |
| 61355 | ***** | ***** | | | |

[ROUTE SEARCH NODE TABLE]

TBL23

| NODE NUMBER | NUMBER OF LINK CON. | LINK CONNECTION INFORMATION |||||| NODE COORDINATES (x, y) | DETAIL ATTRIBUTION OF NODE ||
|---|---|---|---|---|---|---|---|---|---|---|
| | | CON. 1 | CON. 2 | CON. 3 | CON. 4 | ... | CON. α | | INFORMATION OF RIGHT/LEFT TURN REGULATION | ... |
| 1 | 4 | 61353 | 61002 | 61466 | 61003 | ... | ... | (**789, **149) | 61003 NO RIGHT TURN | ... |
| 2 | 3 | 61354 | 61312 | 61353 | | ... | ... | (**873, **979) | NO LIMIT | ... |
| 3 | 2 | 61354 | 61355 | | | | | (**933, **839) | NO LIMIT | ... |

FIG. 12B

[ROUTE GUIDANCE LINK TABLE] ~TBL12

| LINK NUMBER | DETAIL ATTRIBUTION OF LINK | |
|---|---|---|
| | TYPE OF LINK | NUMBER OF LANES |
| 61002 | STATE ROAD | 1 |
| 61353 | INTERSTATE ROAD | 3 |
| 61354 | INTERSTATE ROAD | 3 |
| ... | ... | ... |

[ROUTE GUIDANCE NODE TABLE] ~TBL22

| NODE NUMBER | NUMBER OF LINK CON. | LINK CONNECTION INFORMATION | | | | | | NODE COORDINATES (x, y) | DETAIL ATTRIBUTION OF NODE |
|---|---|---|---|---|---|---|---|---|---|
| | | CON. 1 | CON. 2 | CON. 3 | CON. 4 | ... | CON. α | | INFORMATION OF TRAFFIC LIGHT |
| 1 | 4 | 61353 | 61002 | 61466 | 61003 | ... | | (**789, **149) | TRAFFIC LIGHT EXIST |
| 2 | 3 | 61354 | 61312 | 61353 | | ... | | (**873, **979) | TRAFFIC LIGHT EXIST |
| 3 | 2 | 61354 | 61355 | | | ... | | (**933, **839) | NO TRAFFIC LIGHT |
| ... | | | | | | | | ... | ... |

FIG. 16A

[COMMON NODE TABLE] ~TBL30

| NODE NUMBER | NUMBER OF LINK CON. | LINK CONNECTION INFORMATION | | | | | | NODE COORDINATES (x,y) |
|---|---|---|---|---|---|---|---|---|
| | | CON. 1 | CON. 2 | CON. 3 | CON. 4 | ... | CON. α | |
| 1 | 4 | 61353 | 61002 | 61466 | 61003 | ... | | (**789, **149) |
| 2 | 3 | 61354 | 61312 | 61353 | | ... | | (**873, **979) |
| 3 | 2 | 61354 | 61355 | | | ... | | (**933, **839) |

FIG. 16B

[ROUTE SEARCH NODE TABLE] ~TBL33

| NODE NUMBER | DETAIL ATTRIBUTION OF NODE |
|---|---|
| | INFORMATION OF RIGHT/LEFT TURN REGULATION |
| 1 | NO RIGHT TURN |
| 2 | NO LIMIT |
| 3 | NO LIMIT |
| ... | ... |

FIG. 16C

[ROUTE GUIDANCE NODE TABLE] ~TBL32

| NODE NUMBER | DETAIL ATTRIBUTION OF NODE |
|---|---|
| | INFORMATION OF TRAFFIC LIGHT |
| 1 | TRAFFIC LIGHT EXIST |
| 2 | TRAFFIC LIGHT EXIST |
| 3 | NO TRAFFIC LIGHT |
| ... | ... |

ELECTRIC DEVICE FOR EXECUTING PROCESS BASED ON MAP DATA

CROSS REFERENCE TO RELATED APPLICATIONS

This application is based on Japanese Patent Application No. 2010-19095 filed on Jan. 29, 2010, and No. 2010-249783 filed on Nov. 8, 2010, the disclosures of which are incorporated herein by reference.

FIELD OF THE INVENTION

The present invention relates to an electric device for executing a process based on a map data.

BACKGROUND OF THE INVENTION

Conventionally, an electric device for executing a process based on a map data is, for example, an in-vehicle device such as a navigation device, which is disclosed in JP-A-2008-241659 corresponding to US 2008/0243368. The in-vehicle device displays a map image on a display device, searches a guidance route to a destination, and guides the route or guides a road around a current position of the vehicle. A format of the map data is, for example, a KIWI format, which is disclosed in "Map data format KIWI for a vehicle navigation system," in DENSO Technical Review, 2001, on Volume 6, Part 1, pages 29-34. With using this format, a road data is shown as a link and a node. A link data of each link for representing a link attribution such as a shape of a link and a street address is stored in the map data.

In a conventional map data, a unique link ID is assigned in each link. The link ID is used for linking a link data corresponding to the link ID with other data. For example, the link ID is used for representing a connection relationship of the link. In a conventional map data, for example, multiple link data are integrated into link sequence data. The link sequence data includes a node data showing a connection relationship of links with using the link ID. The node data relates to a node for connecting links. Further, information relating to existence of a traffic signal at an intersection corresponding to the node and traffic regulations such as right and/or left turn prohibition is stored in the node data.

Here, the conventional map data includes the link data relating to the link and the node data relating to the node, and therefore, the conventional map data includes information about coordinates of the link data and the node data, which is doubly held in the map data. Thus, the present inventors consider that information stored as the node data may be distributed and stored in the link data so that the node data can be deleted.

However, in the map data, when the node data is deleted, and the information about a connection relationship of links, which is previously stored as the node data, is distributed to and stored as the link data, it is required to refer to multiple link data so that information relating to the node such as the link connection relationship is obtained.

Accordingly, when the map data does not include the node data, a load of a process for detecting a condition of the node such as link connection relationship at the node increases.

SUMMARY OF THE INVENTION

In view of the above-described problem, it is an object of the present disclosure to provide an electric device for executing a process based on a map data. In the map data, information relating to a node is distributed and stored in a link data, and further, a load for processing information relating to the node based on the map data is reduced.

According to an aspect of the present disclosure, an electric device for executing a process based on a map data includes: a map data memory for storing the map data; a work memory; and a CPU for reading out the map data from the map data memory and for developing the map data into the work memory. The CPU executes the process based on the developed map data in the work memory. The map data in the map data memory provides a road network, which is defined by a plurality of unit links and a plurality of link connection relationships. Each link represents a part of a road. Each link connection relationship represents a connection between links at a connection point. The map data includes an attribution data in each link. The attribution data provides attribution of a corresponding link and attribution of an end of the corresponding link. The attribution of the end includes connection relationship information of the corresponding link at the end. The CPU generates a node table according to the attribution data. The node table stores a link connection information in each node as the connection point coupled with a plurality of links. The link connection information provides identification of the plurality of links, which are coupled with each other at a corresponding node. The CPU writes the node table as the developed map data into the work memory.

In the above device, when the map data is developed in the work memory, the CPU generates the link connection information showing the link connection relationship at a corresponding node, and generates the node table storing the link connection information. Accordingly, even if the map data does not include the node data, and the link connection information is distributed and described in the attribution data of each link, the CPU can specify the link connection relationship at each node according to the node table. Thus, since the CPU references the node table, a process load for the node is limited. Thus, even when the map data is compacted, the process performance relating to the node is improved.

BRIEF DESCRIPTION OF THE DRAWINGS

The above and other objects, features and advantages of the present invention will become more apparent from the following detailed description made with reference to the accompanying drawings. In the drawings:

FIG. 2 is a diagram showing a construction of an integrated file for providing a basic data or an extended data;
FIG. 4A is a diagram showing a construction of a link record of the road data,
and FIG. 4B is a diagram showing a construction of a coordinate record of the road data;
FIGS. 7A and 7B are diagrams showing a connection relationship of links, which are shown as the link record.

FIGS. 12A and 12B are diagrams showing a construction of a link table and a node table;

FIGS. 16A to 16C are diagrams showing a construction of a node table according to a modification of the example embodiment.

DETAILED DESCRIPTION OF THE PREFERRED EMBODIMENTS

Figure 10:
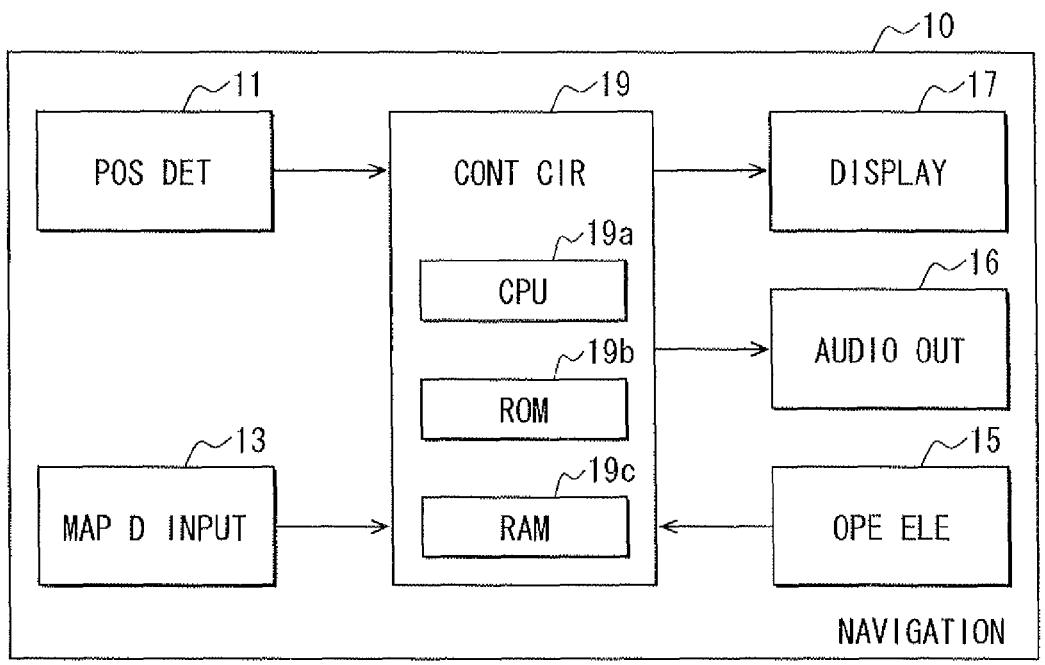
FIG. 10 is a block diagram showing a navigation device.

A navigation device 10 according to an example embodiment is shown in FIG. 10. A map data is stored in the navigation device 10, and has a specific feature. The map data structure will be explained firstly. Then, the structure and operation of the navigation device 10 are explained later.

(Construction of Map Data)

Figure 1:
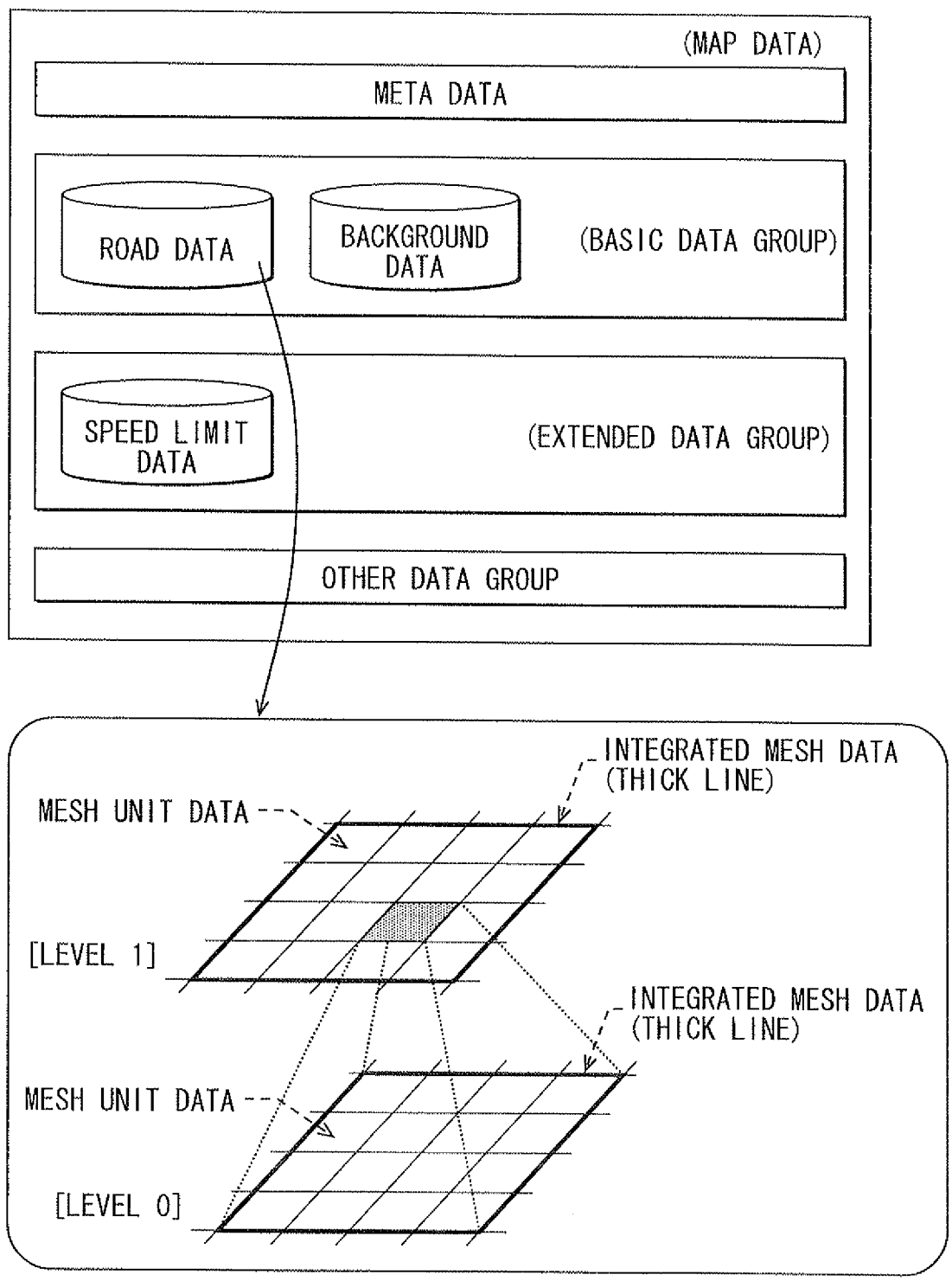
FIG. 1 is a diagram showing a construction of a map data.

A map data according to a present embodiment is used in a navigation device mounted on a vehicle. As shown in FIG. 1, the map data includes a meta data, a basic data group, an extended data group and other data groups.

The meta data represents control information about a construction of the map data. The basic data group represents basic information of a map, which is one of data groups of the map data. The basic data group includes a road data relating to the information of roads and background data relating to information of a background on a two-dimensional map.

The extended data is added in the map data appropriately. In the map data structure, multiple map data may be created according to a type of the extended data group in the map data. The extended data group includes, for example, a speed limit data. The other groups may include an image data group used for displaying the map and an icon data group.

Each basic data in the basic data group such as the road data and each extended data in the extended data group such as the speed limit data are divided into multiple mesh unit data, which are obtained by segmentalizing a whole area of the map included in the map data, as shown in FIG. 1. In each of the basic data and the extended data, the group of multiple mesh unit data is integrated into the integrated mesh data. Here, the integrated mesh data does not combine all mesh unit data corresponding to a whole area of the map data, but the integrated mesh data combines multiple mesh unit data. Thus, multiple integrated mesh data correspond to a whole area of the map data.

Specifically, each of the basic data and the extended data is layered, i.e., hierarchized by a level of detail of the map. Thus, each of the basic data and the extended data is an integrated file, which includes multiple integrated mesh data corresponding to a whole area of the map in each layer, as shown in FIG. 2.

FIG. 1 shows mesh unit data in a lowest layer defined as a 0th level and mesh unit data in a layer higher by one layer than the lowest layer defined as a first level. The mesh unit data in the first level is divided into multiple mesh unit data in the 0th level. Specifically, in FIG. 1, one mesh unit data of the first level is divided into a predetermined number of mesh unit data of the 0th level. In FIG. 1, one mesh unit data is divided into sixteen mesh unit data. Here, a layer is defined as a level.

Thus, an area of the mesh unit data in each of the basic data and the extended data increases when the level becomes high. The map information corresponding to the mesh unit data is roughened when the level becomes high. The mesh unit data in the upper level is used for searching a route having a long distance and for displaying the map with wide range.

(Construction of Integrated File)

As described above, each of the basic data such as the road data and the background data and the extended data such as the speed limit data is the integrated file, which combines mesh unit data in each level. Specifically, the integrated file is shown in FIG. 2.

Specifically, the integrated file includes an integrated mesh data number list La1 for providing the mesh data number in each level, an integrated mesh data offset list La2 for providing an offset of the integrated mesh data in each level, and an integrated mesh data list La3 for providing an integrated mesh data in each level. Here, the number A0-AX of the integrated mesh data shows the number of integrated mesh data in a certain level. The number A0-X is defined by a fixed length.

The offset of the integrated mesh data shows an offset to the corresponding integrated mesh data. Specifically, the offset of the integrated mesh data shows a value defined by a byte position from a reference position, at which the corresponding integrated mesh data is stored. The offset of the integrated mesh data is defined by the fixed length. The reference position may be a beginning position of an area in which the offset is written, a beginning position of the integrated mesh offset list La2, or a beginning position of the integrated mesh data list La3. When there is no corresponding integrated mesh data, the offset of the integrated mesh data is defined as a 0th value, i.e., "0xFFFFFFFF."

The integrated mesh data includes a mesh unit data offset list La4 and a mesh unit data list La5. The mesh unit data offset list La4 includes information of an integrated mesh data size, the number M of meshes, and offsets 1-M of the mesh unit data. The mesh unit data list La5 includes information of mesh unit data 1-M. The integrated mesh data size shows a total size of the integrated mesh data. The integrated mesh data size is defined by a fixed length. The mesh number M shows the number of meshes in a map area corresponding to the integrated mesh data. The mesh number M is also defined by a fixed length.

The mesh unit data offset shows an offset of the corresponding mesh unit data. Specifically, the offset is a value defined by the byte position, at which the corresponding mesh unit data is stored, from the reference position. The offset is defined by the fixed length. Here, the reference position is, for example, a beginning position of an area in which the offset is written, a beginning position of the mesh unit data offset list La4, or a beginning position of the mesh unit data list La5. When there is no corresponding integrated mesh data, the offset of the mesh unit data is defined as a 0th value, i.e., "0xFFFFFFFF."

The mesh unit data 1-M includes information, which provides core information of the basic data and the extended data. The mesh unit data 1-M is described in a format corresponding to the type of the basic data and the extended data. The structure of the road data and the structure of the speed limit data as typical data will be explained. The background data, which is not explained as follows, has similar structure as the road data. The background data shows a relationship between a record group of a type of a background feature for providing the map and a record group of a lay out position (i.e., coordinates) of the background feature.

(Mesh Unit Data of Road Data)

Figure 3:
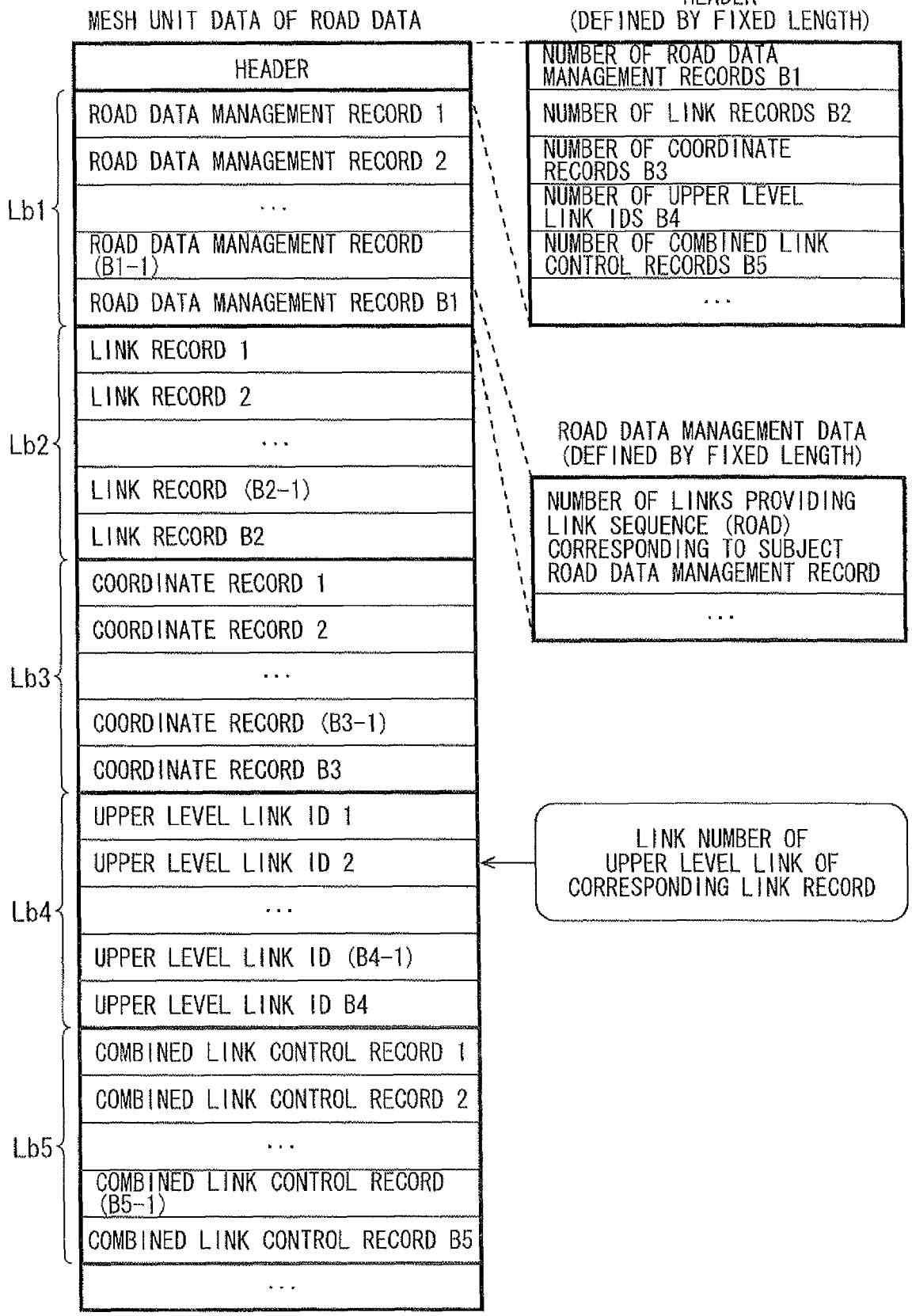
FIG. 3 is a diagram showing a construction of a mesh unit data in a road data.

The road data includes information about a road. As shown in FIG. 3, the mesh unit data of the road data includes a road data management list Lb1, a link list Lb2, a coordinate list Lb3, an upper level link ID list Lb4 and a combined link list Lb5. The road data management list Lb1 includes information of a header and a group of road data management records 1-B1. The link list Lb2 includes a group of link records 1-B2. The coordinate list Lb3 includes coordinate records 1-B3. The upper level link ID list Lb4 includes a group of upper level link IDs 1-B4. The combined link list Lb5 includes a group of combined link control records 1-B5.

(Header)

The header stored in the mesh unit data of the road data is defined by the fixed length. The header includes information of the number B1 of the road data management records, the number B2 of the link records, the number 133 of the coordinate records, the number 134 of the upper level link IDs and the number B5 of the combined link control records.

(Road Data Management Record)

The road data management record is defined by the fixed length in each record. The road data management record includes information of the number of links. The road data management record controls a series of link sequences, which provides the same street, i.e., the same road. The number of links shows the number of links in the link sequences, which is controlled with the road data management record. Specifically, when the mesh unit data of the road data is created, the links in a corresponding mesh are separated into one or more link sequences, each of which provides the same street. The road data management record of each link sequence, which is classified in the same group, is stored in the mesh unit data of the road data. Other data showing the characteristics of the street in addition to the number of links is stored in the road data management record.

(Link Record)

The link record is defined by the fixed length. The link record provides attribute information relating to the link in each record. The link record corresponding to a link in the mesh is stored in the mesh unit data of the road data.

FIG. 4A shows the structure of the link record. As shown in FIG. 4A, the information about the type of a link, a length of the link, and the number of traffic lanes is stored in the link record. Further, the information about the number of coordinate points from the starting point to the ending point in the corresponding link is stored in the link record.

In the map data, the nodes are arranged on respective ends of the link. Here, the node is shown as a black circle in FIG. 5A. Multiple shape interpolation points are arranged between two nodes. The shape interpolation point is shown as a white circle in FIG. 5A. The shape interpolation point is used for representing a shape of the link, which may be curved between both ends of the link. Each coordinates of the nodes and the shape interpolation point are defined by the coordinate record. The number of coordinate points provided by the link record is equal to the number of the nodes and the shape interpolation points, which are arranged in the link.

The information of the speed category and the flag for determining whether the information of the speed limit exists are stored in the link, record. The speed category shows a category of the speed limit as a legal speed, which is set in the corresponding link. Specifically, when the information of the speed limit is classified into groups, the speed category shows a group of the speed region of the speed limit of the corresponding link.

The flag for determining whether the information of the speed limit exists shows whether a speed limit data control record corresponding to the link exists in the speed limit data as an extended data. The speed limit data control record shows detailed conditions of a speed limit (i.e., legal limit speed) of the link, which is more extensive than the speed category.

A link direction attribution is stored in the link record. The link direction attribution shows a direction of the link, to which a vehicle can travel. Specifically, the link direction attribution includes "forward way available" attribution, "reverse way available" attribution, "both ways available" attribution and "no through road" attribution. The "forward way available" attribution shows that the vehicles is travelable along with only a direction from a starting point of the link to an ending point of the link. The direction from the starting point to the ending point provides a forward direction. The "reverse way available" attribution shows that the vehicle is travelable along with only a direction from an ending point of the link to a starting point of the link. The direction from the ending point to the starting point provides a reverse direction. The "both ways available" attribution shows that the vehicle can be travelable along with each of the forward direction and the reverse direction. The "no through road" attribution shows that the vehicle cannot travel along with both of the forward direction and the reverse direction.

Further, the link record includes a flag for showing existence of combined link control information on a starting point side, a flag for showing existence of combined link control information on an ending point side, a flag for showing existence of a traffic signal at a starting point node of the link, a flag for showing existence of a traffic signal at an ending point node of the link, a flag for showing existence of a node, corresponding to the starting point node of the link, in the mesh unit data of the upper level, and a flag for showing existence of a node, corresponding to the ending point node of the link, in the mesh unit data of the upper level. The flag for showing existence of combined link control information on the starting point side represents whether the combined link control record exists in the combined link control list Lb5. The combined link control record shows the traffic regulation from the starting point of the subject link to the object link such as right or left turn prohibition. The flag for showing existence of combined link control information on the ending point side represents whether the combined link control record exists in the combined link control list Lb5. The combined link control record shows the traffic regulation from the ending point of the subject link to the object link.

Further, the link record includes information of the object link, which is connected to the starting point of the subject link and information of the object link, which is connected to the ending point of the subject link. Specifically, the "information of the object link connected to the starting point of the subject link," which is stored in the link record, includes the number of the object link connected to the starting point and the connection attribution of the starting point. The number of the object link connected to the starting point shows the link number of the object link connected to the starting point of the subject link. Here, the "link number" is defined as the arrangement number of the link record from the top of the link list Lb2. Specifically, the N-th link record counted from the top of the link list Lb2 represents the link record of the link number N. The link having the link number N is the link corresponding to the N-th link record from the top of the link list Lb2. In the map data according to the present embodiment, the link number is used, instead of a link ID, which is used in a conventional map data. In the conventional map data, an absolute link ID is defined in each link. Thus, in the map data according to the present embodiment, the absolute link ID is not defined in each link.

The link record stores the link number of only one link among other multiple links, which is connected to the starting point of the subject link, according to predetermined regulations, and the stored link number provides the link number of the object link connecting to the starting point of the subject link. The connection relationship of links will be explained later.

In the link record, the connection attribution of the starting point described together with the link number of the object link connecting to the starting point of the subject link shows whether the starting point of the subject link connects the starting point or the ending point of the object link corresponding to the link number of the object link connecting to the starting point of the subject link. Specifically, the connection attribution of the starting point is defined by the "starting point" or the "ending point." For example, when the connection attribution of the starting point shows the "starting point," the "starting point" of the object link corresponding to the link number of the object link connecting to the starting point of the subject link is connected to the starting point of the subject link corresponding to the link record, in which the link number of the object link connecting to the starting point of the subject link is stored. When there is no object link connecting to the starting point of the subject link in the same mesh, the link number of the object link connecting to the starting point of the subject link is defined as the link number of the subject link. In this case, the connection attribution of the starting point shows the "starting point" of the subject link. An example of a case where there is no object link connecting to the starting point of the subject link in the same mesh is a case where the road dead-ends, or a case where the starting point of the subject link is the node disposed at the boundary to the adjacent mesh and connected to only a link disposed in the adjacent mesh. The node disposed at the boundary to the adjacent mesh is defined as a boundary node. In the present embodiment, since the mesh unit data is a closed data, the connection relationship of the links including the boundary node, which is disposed at the boundary to the adjacent mesh, only describes only the connection relationship of the links in the subject mesh.

Similarly, the "information of the object link connected to the ending point of the subject link" includes the link number of the object link connected to the ending point and the connection attribution of the ending point. The link number of the object link connected to the ending point shows the link number of the object link connected to the ending point of the subject link. The link record stores the link number of only one object link among other multiple object links, which is connected to the ending point of the subject link, according to predetermined regulations, and the stored link number provides the link number of the object link connecting to the ending point of the subject link. The connection attribution of the ending point described together with the link number of the object link connecting to the ending point of the subject link shows whether the ending point of the subject link connects the starting point or the ending point of the object link corresponding to the link number of the object link connecting to the ending point of the subject link. When there is no object link connecting to the ending point of the subject link in the same mesh, the link number of the object link connecting to the ending point of the subject link is defined as the link number of the subject link. In this case, the connection attribution of the ending point shows the "ending point" of the subject link.

The link record stores the attribution information of the link mainly.

(Coordinate Record)

In the mesh unit data of the road data, the coordinate list Lb3 including the coordinate records 1-B3 describes that the coordinates (i.e., the latitude degree and the longitude degree) of each of the nodes and the shape interpolation points, which are set in each link registered in the link list Lb2, are defined in each of the nodes and the shape interpolation points. Specifically, the coordinate records 1-B3 shows the coordinates of the corresponding node or the corresponding shape interpolation point.

FIG. 4B shows the construction of the coordinate record. The coordinate record is defined by the fixed length. The coordinate record includes information about the type of coordinates, the X coordinate as the coordinate of the longitude degree, and the Y coordinate as the coordinate of the latitude degree. The type of coordinates shows information whether the corresponding point is the boundary node, the node other than the boundary node, the dummy node or the shape interpolation point.

The coordinate record stores the identification information of the adjacent mesh, to which the boundary node is connected. The identification information shows a valid value only when the type of the coordinates in the coordinate record is the "boundary node." When the type of the coordinates is a node other than the boundary node, the identification information shows a blank. The boundary node is disposed at the boundary to the adjacent mesh. The "identification information of the adjacent mesh connecting to the boundary node" is defined by information whether the boundary node is disposed on one side of four sides or one corner of four corners of the mesh corresponding to the mesh unit data. Here, the mesh has a rectangular shape, as shown in FIG. 1.

(Data Arrangement)

Figure 5A:
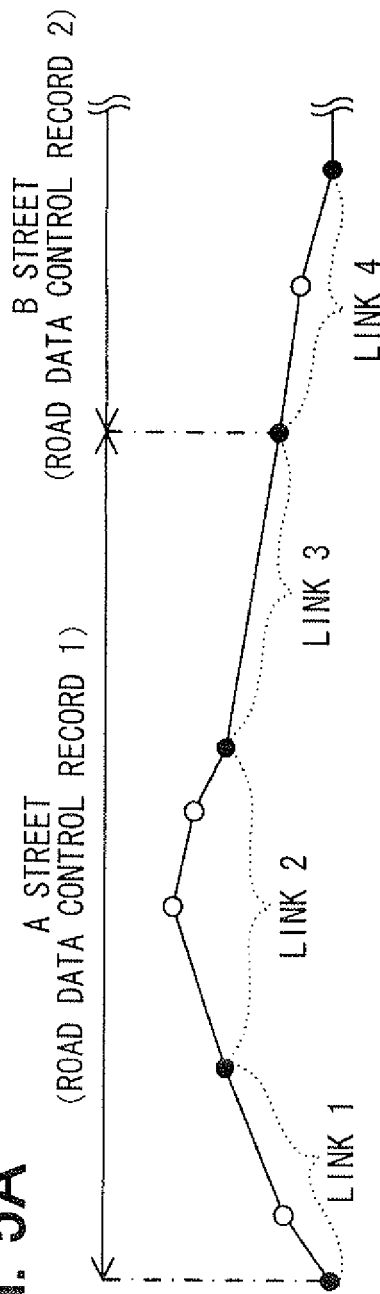
FIGS. 5A and 5B are diagrams showing a relationship between a road data management record, the link record and the coordinate record.

The arrangement of the road data control record 1-B1 in the road data control list Lb1, the arrangement of the link records 1-B2 in the link list Lb2, and the arrangement of the coordinate records 1-B3 in the coordinate list Lb3 will be explained with reference to FIGS. 5A and 5B.

The road data control record is used for controlling the link sequence. The link record includes the attribution information of the link. The coordinate record includes coordinate information of each point (i.e., each of the nodes and the shape interpolation points), which is set in the link. Thus, the coordinate record relates to the link record. The link record relates to the road data control record.

In the present embodiment, record association among the road data control list Lb1, the link list Lb2 and the coordinate list Lb3 is performed by aligning the arrangement order in the list. FIG. 5B shows a relationship among the road data control list Lb1, the link list Lb2 and the coordinate list Lb3, which are obtained from the map shown in FIG. 5A that includes the streets, the links, the nodes and the shape interpolation points. In FIG. 5A, an open circle represents a node, and a closed circle represents a shape interpolation point.

Figure 5B:
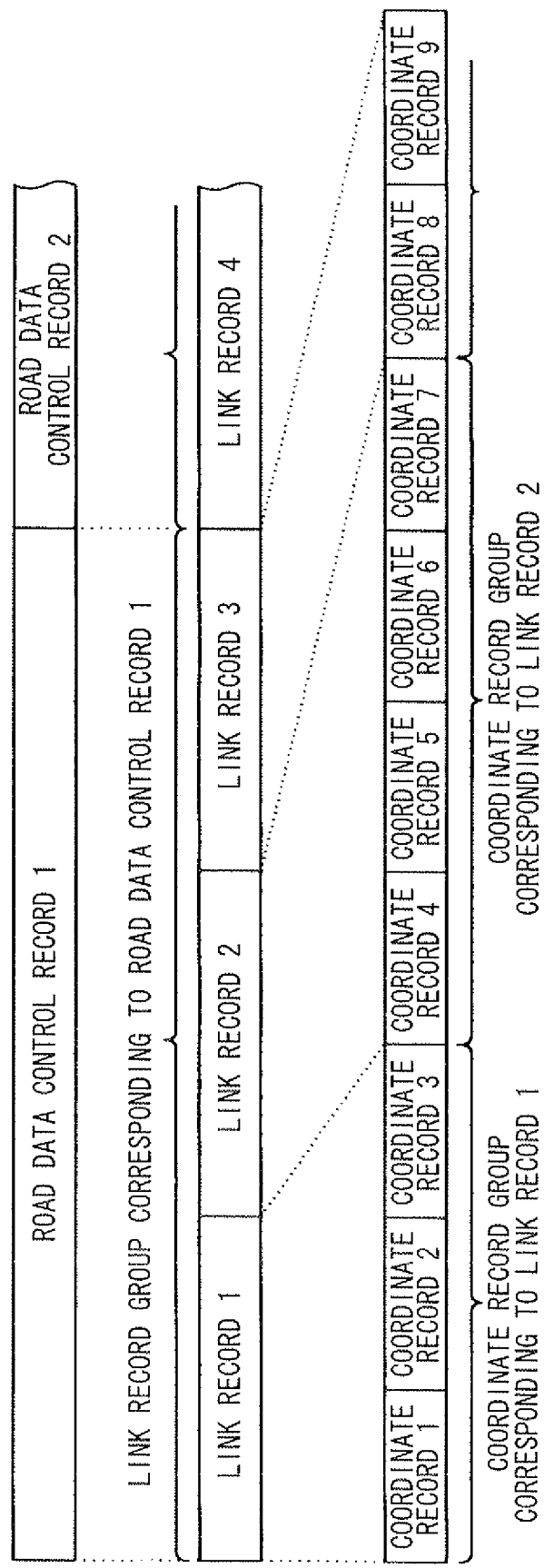

In the present embodiment, as shown in FIG. 5B, the link record group corresponding to the road data control record 1, which provides the arrangement number 1 in the road data control list Lb1, is arranged at a top of the link list Lb2. The link record group of the link sequence corresponding to the road data control record 2 having the arrangement number 2 in the road data control list Lb1 is arranged next to the link record group of the link sequence corresponding to the road data control record 1 having the arrangement number 1 in the road data control list Lb1. Thus, the arrangement order of the street in the road data control list Lb1 is the same as the arrangement order of the link sequence in the link list Lb2. In view of this point, the road data control list Lb1 and the link list Lb2 are generated, so that multiple attributions about the streets are associated with each other.

In the present embodiment, the arrangement of the streets corresponding to the road data control records 1-B1 in the road data control list Lb1 and the arrangement of the streets corresponding to the link records 1-B2 in the link list Lb2 are aligned, i.e., equalized in the same order. Thus, the road data control list Lb1 and the link list Lb2 are associated with each other.

Here, the road data control record stores the information of the number of links. Thus, even when multiple link records are associated with only one road data control record, the top of the road data control list Lb1 and the top of the link list Lb2 are read out and referred so that the relationship between the road data control list Lb1 and the top of the link list Lb2 is specified.

The link record registered in the link list Lb2 is an attribution data showing the first attribution of the link, i.e., the characteristics of the road link. The coordinate record corresponding to this link is an attribution data showing the second attribution of the link. In the present embodiment, as shown in FIG. 5B, the coordinate record group of the points set in the link corresponding to the link record 1 having the arrangement number 1 in the link list Lb2 is arranged from a tip of the coordinate list Lb3. The coordinate record group of the points set in the link corresponding to the link record 2 having the arrangement number 2 in the link list Lb2 is arranged next to the coordinate record group corresponding to the link record 1 in the link list Lb2. Thus, the link list Lb2 and the coordinate list Lb3 are generated to equalize the arrangement order of the links between the link list Lb2 and the coordinate list Lb3.

In the present embodiment, the arrangement of the links corresponding to the coordinate records 1-B3 in the coordinate list 1b3 is aligned to have the same order as the link list Lb2. Thus, the link list Lb2 and the coordinate list Lb3 are associated with each other. Here, since the link record stores the information of the number of coordinate points, even when multiple coordinate records are associated with only one link record, the relationship between the link record 1-B2 and the coordinate record 1-B3 is specified by referring to and reading out from the top of the link list Lb2 and the top of the coordinate list Lb3. Here, the coordinate record group corresponding to the only one link record is arranged in the coordinate list Lb3 in an order from a starting point to an ending point of the link. Since the coordinate record of the ending point of the link shows the same coordinates as the coordinate record of the starting point of the adjacent link, the registration of the coordinate record can be skipped.

(Connection Relationship of Links)

A defining method of a connection relationship of the links will be explained. In the present embodiment, the link record stores information about only one object link, which is connected to the starting point and/or the ending point of the subject link. Specifically, the link record stores only the "information of the object link connected to the starting point of the subject link" and the "information of the object link connected to the ending point of the subject link." These features are different from the conventional map data, which describes information about all links connected to a subject node.

Specifically, in the present embodiment, the connection relationship of multiple links, which are connected to the same node, is described such that the link number of the adjacent link in the link record of each link connected to the same node is defined as a connection link number in a clockwise manner. Here, the connection link number includes a starting point connection link number and an ending point connection link number. Specifically, in the present embodiment, the connection relationship of the link connected to the node is not described as a batch of the node data in a conventional art. However, the connection relationship of the link connected to the node according to the present embodiment is described as a dispersed expression with the link record of each link, which is connected to the same node. When the map data is used, these link records are referenced in a clockwise manner around the node so that the link connected to the same node is specified.

Figure 6A:
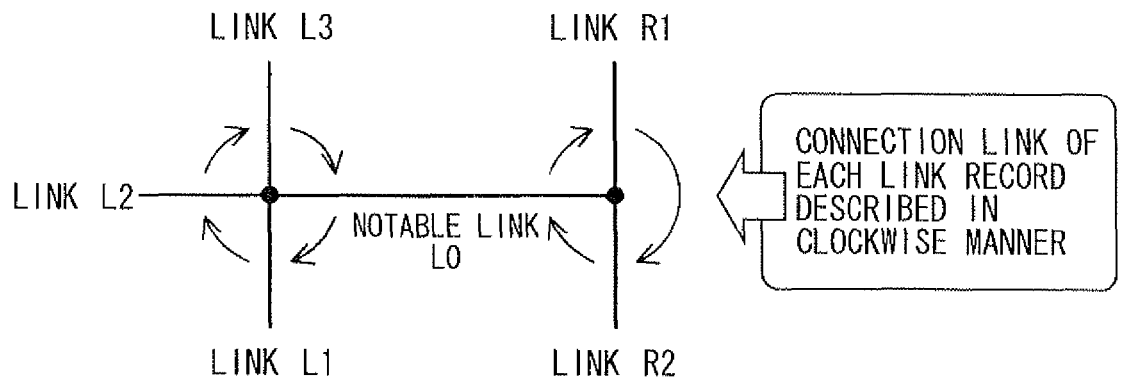
FIGS. 6A and 6B are diagrams showing a connection relationship of links, which are shown as the link record.
Figure 6B:
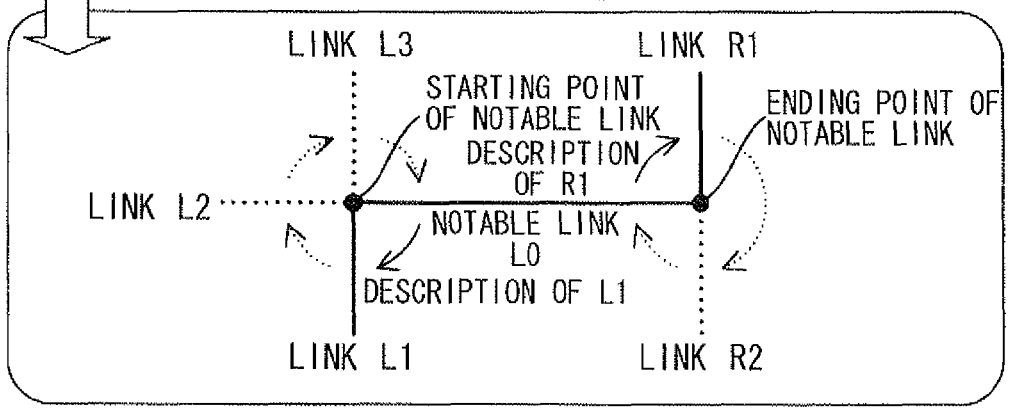

FIG. 6A shows a description direction of the connection link number together with an example of the connection relationship of the links. Specifically, the connection relationship of other links as object links at the starting point and the ending point of the notable link L0 as the subject link is described as follows. FIG. 6B shows the starting point connection link number and the ending point connection link number described in the link record of the notable link L0 in FIG. 6A. In FIGS. 6A and 6B, the object links connected to the starting point of the notable link. L0 are the link L1 to the link L1 The link among the object links L1-L3 adjacent to the notable link L0 measured from the notable link L0 in a clockwise manner is the link L1. Accordingly, the starting point connection link number in the link record of the notable link L0 is the link number of the link L1.

The other links connected to the ending point of the notable link L0, i.e., a remarkable link, is the link R1 and the link R2. The link among the object links R1-R2 adjacent to the notable link L0 measured from the notable link L0 in a clockwise manner is the link R1. Accordingly, the ending point connection link number in the link record of the notable link L0 is the link number of the link R1.

Next, FIG. 7A shows the connection link number described in the link record of the links L1-L3 in FIGS. 6A and 6B.

As shown in FIG. 7A, the link adjacent to the link L1 measured around the starting point of the notable link L0 in the clockwise manner is the link L2. Accordingly, the link number of the link L2 is described as the starting or ending point connection link number (i.e., the starting point connection link number or the ending point connection link number) of the link L1 in the link record of the link L1, which overlaps with the notable link L0 at the starting point of the notable link L0. The link adjacent to the link L2 measured in the clockwise manner is the link L3. Thus, the link number of the link L3 is described as the starting or ending point connection link number of the link L2 in the link record of the link L2, which overlaps with the notable link L0 at the starting point of the notable link L0. The link adjacent to the link L3 and measured in the clockwise manner is the notable link L0. Thus, the link number of the notable link L0 is described as the starting or ending point connection link number of the link L3 in the link record of the link L3, which overlaps with the notable link L0 at the starting point of the notable link L0.

In the present embodiment, multiple link records are described in above ways, so that the link connection relationship of the starting point of the notable link L0 is described.

FIG. 7B shows the connection link number described in the link record of the link R1, R2. As shown in FIG. 7B, the link adjacent to the link R1 measured around the ending point of the notable link L0 in the clockwise manner is the link R2. Accordingly, the link number of the link R2 is described as the starting or ending point connection link number (i.e., the starting point connection link number or the ending point connection link number) of the link R1 in the link record of the link R1, which overlaps with the notable link L0 at the starting point of the notable link L0. The link adjacent to the link R2 measured in the clockwise manner is the notable link L0. Thus, the link number of the notable link L0 is descried as the starting point or the ending point connection link number of the link R2, which overlaps the notable link L0 at the ending point.

In the present embodiment, the link connection relationship of the ending point of the notable link L0 is described with using multiple link records.

An expression method of the link connection relationship is described above. In the present embodiment, since the expression method of the link connection relationship is defined in the above manner, it is not necessary to add a node data showing the link connection relationship in the map data, so that the map data is compacted.

(High Level Link ID)

Next, an upper level link ID shown in FIG. 3 will be explained. The upper level link ID stored in each mesh unit data of the road data shows the link number of the upper level link corresponding to the subject link. The upper level link ID is defined by the fixed length. Here, the link number of the upper level link is the arrangement number in the mesh unit data of the upper level mesh from the top of the link list Lb2. The upper level link ID is used for definition of the relationship between the link in a subject level mesh and the link in an upper level mesh.

Specifically, in the upper level link ID list Lb4, the upper level link IDs ID1-IDB4 of the upper level links are arranged in the same arrangement order of the link arrangement of the link list Lb2 in each link of the link record registered in the link list Lb2. Thus, the arrangement order in the upper level link ID list Lb4 coincides with the arrangement order in the link list Lb2, the upper level link IDs ID1-IDB4 in the upper level link ID list Lb4 is associated with the link records 1-B2 in the link list Lb2.

(Combined Link Control Record)

The combined link control record will be explained with reference to FIG. 8. The combined link control record stored in the mesh unit data of the road data is defined by a variable length. The combined link control record includes the link number of the object link, the attribution of the destination point, the number C of destination links, and the destination link list Lc including a group of destination link data 1-C. The combined link control record represents a destination link, into which the vehicle goes from the starting point or the ending point of the subject link corresponding to the subject link number. Specifically, the vehicle gets out from the subject link into the destination link.

Specifically, the number C of the destination links shows the number of destination link data, which are registered in the destination link list Lc. Each of the destination link data 1-C provided in the destination link list Lc provides identification information of the destination link, to which the vehicle can go from the starting or ending point of the subject link corresponding to the subject link number. The destination point attribution provides information of the "starting point" or the "ending point." When the destination point attribution is the "starting point," the destination link list Lc of the combined link control record shows the destination link from the starting point of the subject link. When the destination point attribution is the "ending point," the destination link list Lc of the combined link control record shows the destination link from the ending point of the subject link.

Each destination link data includes the identification information of the destination link such as the mesh number as the number of the mesh, in which the destination link exists, and the link number of the destination link as the destination link number. Specifically, the destination link data provides the identification information of the destination link for showing the mesh number and the destination link number.

When the map data according to the present embodiment is used, the traffic regulation such as right turn limitation or left turn limitation at an intersection is specified based on the destination link list Lc and the connection relationship of the links specified by the link record group.

Figure 8:
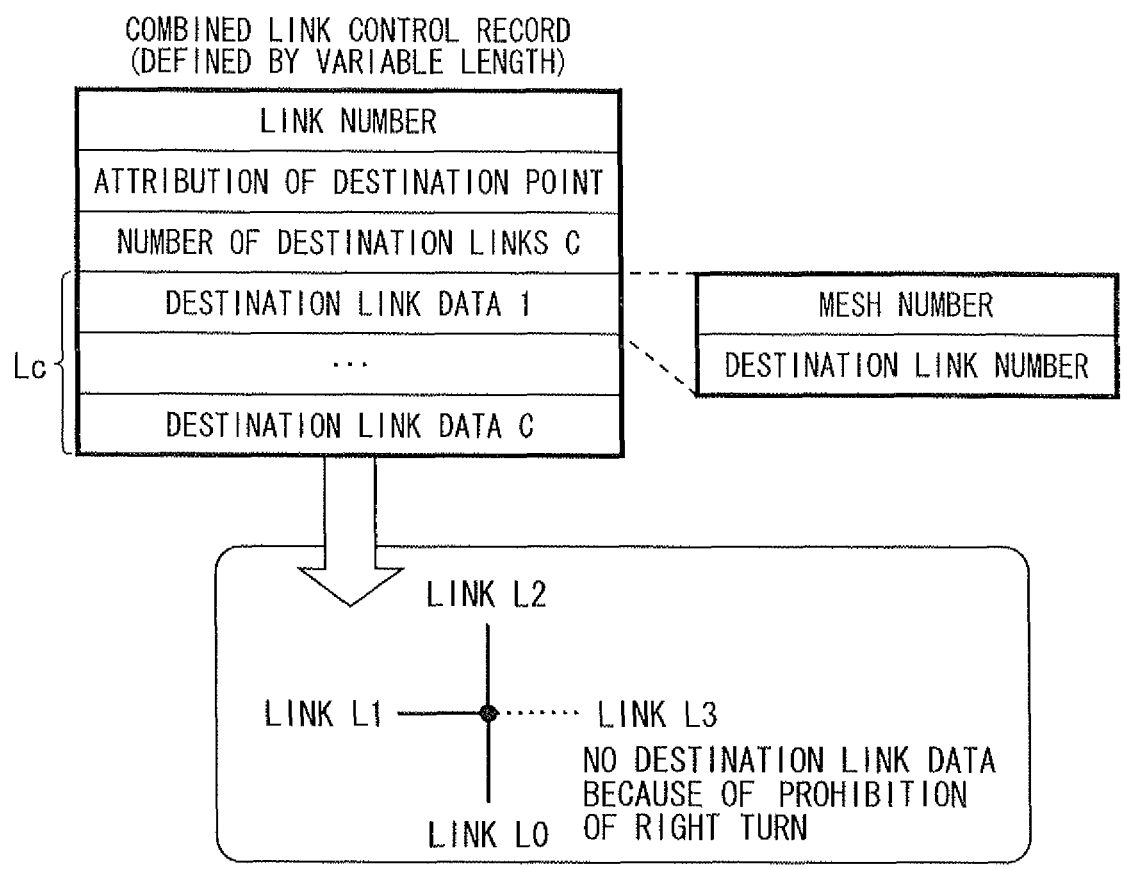
FIG. 8 is a diagram showing a construction of a combined link control record in the road data.

For example, the starting point of the link L0 provides an intersection, from which the links L1-L3 extend, as shown in FIG. 8. In this case, when there is no traffic limitation with respect to the intersection corresponding to the starting point of the link L0, three destination link data showing the destination links L1-L3 are described in the destination link list Lc of the combined link control record having the subject link number of L0 and the destination point attribution of the "starting point." Here, in this case, it is assumed that the vehicle does not U-turn. When the right turn from the link L0 to the link L3 is prohibited, only the destination link data showing the link L1 as the destination link and the destination link data showing the link L2 as the destination link are stored in the destination link list Lc. The destination link data showing the link L3 as the destination link is not stored in the destination link list Lc. The device according to present embodiment specifies the traffic regulation such as the right turn prohibition or the left turn prohibition at the intersection based on difference information between the link connection relationship and the destination link.

(Mesh Unit Data in Speed Limit Data)

Figure 9A:
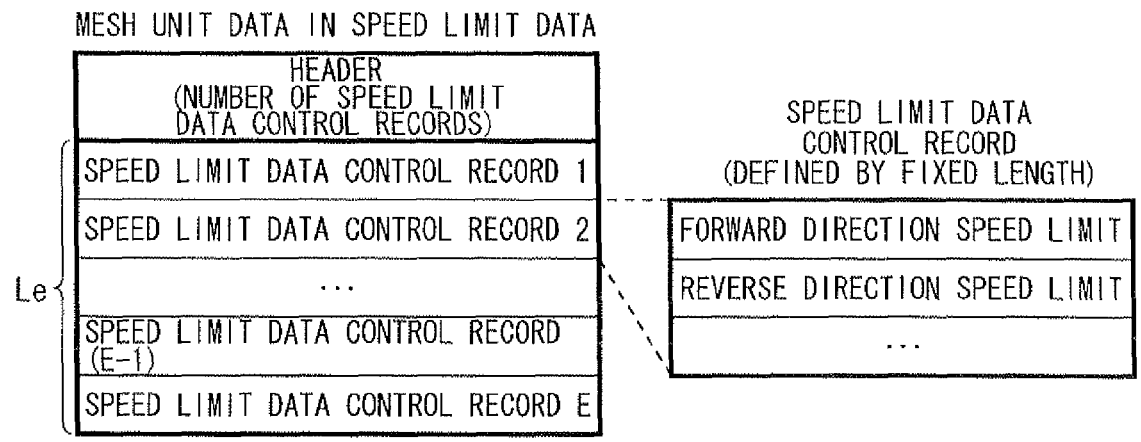
FIGS. 9A and 9B are diagrams showing a speed limit data.

The speed limit data as the extended data shows the speed limit in each link. As shown in FIG. 9A, the mesh unit data in the speed limit data includes the speed limit data control list Le, which provides the header and the speed limit data control records 1-E. FIG. 9A shows the construction of the mesh unit data of the speed limit data.

(Header)

The header stored in the mesh unit data of the speed limit data is defined by the fixed length. The header provides the number E of speed limit data control records and the like.

(Speed Limit Data Control Record)

The speed limit data control record is defined by the fixed length in each record. The speed limit data control record provides the forward direction speed limit and a reverse direction speed limit of the subject link. When there is no speed limit in the subject link, i.e., when the link has no speed limit, a value showing no speed limit is described as the forward direction speed limit or the reverse direction speed limit. When the subject link is a one-way link, one of the forward direction speed limit and the reverse direction speed limit corresponding to a direction, along with the vehicle cannot drive, is defined as vacant data that shows no data.

Figure 9B:
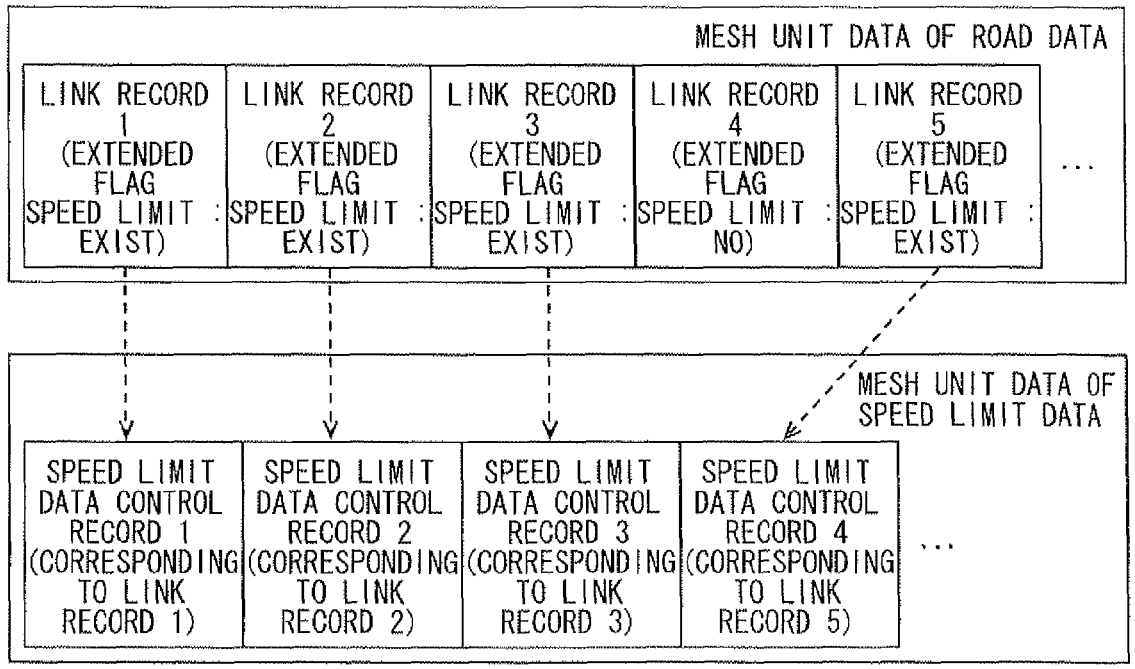

Each of the speed limit data control records corresponds to only one link. Thus, the speed limit data control records are registered in the speed limit data control list Le. Specifically, as shown in FIG. 9B, in the speed limit data control list Le, the speed limit data control records 1-E corresponding to the links are arranged in each link of the link record registered in the link list Lb2 corresponding to the mesh in the same arrangement order as the arrangement of the links in the link list Lb2. FIG. 9B shows a relationship between the arrangement of the link records 1-B2 and the arrangement of the speed limit data control records 1-E.

The speed limit data control record corresponding to the link record, in which the speed limit information existence flag is set to be a value of "no information," is not registered in the speed limit data control list Le. Specifically, the speed limit data control records corresponding to the links are arranged in the speed limit data control list Le in an ascending order of the links corresponding to the link records having the arrangement number in the link list Lb2. When there is no speed limit data control record corresponding to the link record, the speed limit data control record corresponding to the link record next to the link record corresponding to no speed limit data control record fills a position, at which no speed limit data control record corresponding to the link record is to be stored.

In the map data according to the present embodiment, each link record 1-B2 in the road data is associated with a corresponding speed limit data control record 1-E of the speed limit data.

(Summary of Map Data)

Thus, the construction of the map data is explained. In the present embodiment, the road is shown as a link unit. A road network is represented by information showing a connection relationship of the links.

When the map data is generated, the multiple types data relating to components of the map are listed by grouping in each type of data, not by grouping in each component of the map. For example, the multiple types attribution data relating to the links such as a link record, a coordinate record, a speed limit data control record are grouped in each type of the attribution data so that a data list such as a link list Lb2, a coordinate list Lb3, a speed limit data control list Le and the like is obtained. Accordingly, the content of the map data is easily changed.

In the conventional prior art, since the map data has a structure such that multiple types of data are grouped in each element, it is necessary to update a whole of the map data even when an attribution data of a specific type is updated. In the present embodiment, when an attribution data of a specific type is updated, the data list providing the attribution data group of the specific type is replaced to a new version data list, so that the map data is updated. Accordingly, the map data according to the present embodiment has a structure, which is easily updated.

In the map data structure, when a combination of the data lists in the map data such as the extended data is changed, the content of the map data is easily changed. Thus, multiple types of the map data are easily formed. For example, the speed limit data is easily deleted from the map data so that the information about the speed limit is stored in the map data, or the speed limit data is easily added to the map data so that the information about the speed limit is removed from the map data. As a result, various types of map data according to the needs of a user are provided. For example, when a data list providing the map data is individually sold, the user may customize the map data. Thus, the map data is customizable.

In a step of listing into the data list, it is necessary to associate the attribution data (i.e., record) corresponding to the same link in each data list. In the present embodiment, this association is performed based on the arrangement of the data list. Thus, without using the link ID or the like for associating the attribution data, the attribution data is associated according to the arrangement in the data list. Thus, the map data according to the present embodiment is compacted.

Specifically, when each record is defined by a fixed length, the link ID and a code representing a data boundary are not necessary to store at a top of the record. Further, it is not necessary to store an address of an object record in a subject record. Accordingly, the map data according to the present embodiment is minimized. When the record id defined by the fixed length, an accommodation position of the record as an object to be read out can be specified by the arrangement number of the record from the top of the data list and the record length. Thus, accessibility of each record is improved.

Further, in a conventional map data, a node data showing a connection relationship of the links is generated in each node. However, in the present embodiment, the information about the connection relationship of the links is dispersed, and the information is stored in the link record. Accordingly, it is not necessary to generate the node data in the map data. Thus, it is not necessary to maintain information such as coordinate information redundantly in the link data and the node data. Thus, the map data according to the present embodiment is compacted much more.

Specifically, in the present embodiment, only one of the starting point connection link number and the ending point connection link number as the information showing the connection relationship of the links is stored in the link record. Further, only one identification information (i.e., the link number) of the connection object link is stored in the record corresponding to the node (i.e., the starting point or the ending point of the link), to which multiple links are coupled.

Specifically, in the link records of the links, which couple with the same node, the connection link number is stored by a method shown in FIGS. 6A to 7B. Thus, the information showing the connection relationship of the links is effectively stored in the link records of multiple links, which are coupled with the same node. Accordingly, the data amount of the map data according to the present embodiment is reduced effectively.

In the map data structure according to the present embodiment, the connection link number is referenced in a certain order, so that the link records of the links coupled with the same node are easily referenced. Thus, the connection relationship of the links coupled with the same node is effectively specified. Thus, even when the information about the connection relationship of the links is distributed, and stored in the link record, the process load in an in-vehicle device such as a navigation device for specifying the connection relationship of the links is reduced.

In the map data structure according to the present embodiment, the link arrangement number in the link list Lb2 is used for describing the connection relationship. Thus, it is not necessary to set the link ID corresponding to each link. Accordingly, in the map data structure according to the present embodiment, the data is compactly stored.

(Construction of Navigation Device)

A navigation device 10 in which the map data is stored will be explained.

(Basic Structure)

The device 10 is shown in FIG. 10. The device 10 includes a position detection element 11, a map data input element 13, an operation element 15, an audio output element 16, a display element 17 and a control circuit 19.

The position detection element 11 detects a current position of a vehicle, on which the navigation device 10 is mounted. For example, the position detection element 11 includes a conventional gyro scope, a distance sensor, a GPS receiver and the like.

The map data input element 13 includes a storing medium such as a hard disk drive and a DVD, in which the map data is stored. The map data input element 13 inputs the map data stored in the storing medium into the control circuit 19. The input element 13 may include a DVD drive in addition to the hard disk drive for storing the map data. In the navigation device 10, a new data of the map data, which is obtained via a DVD medium, can be installed in the hard disk drive when the input element includes the DVD drive. The navigation device 10 may further include a communication element capable of communicating with an information center, which distributes the map data. Based on the data received from the center via the communication element, the device 10 updates the map data stored in the map data input element 13.

The operation element 15 inputs an instruction from a user into the control circuit 19. The operation element 15 includes a touch panel arranged on the display element 17 and operation switches arranged on a surface of a body of the navigation device 10 and/or in a remote control element. With using the operation element 15, the user operates the navigation device 10 to change a scale of the map, to scroll a screen of the display element 17, to set a destination and so on.

The audio output element 16 includes a speaker and the like. A signal from the control circuit 19 is input into the element 16, so that the element 16 outputs voice guidance and the like. The display element 17 is capable of displaying in full color. The display element 17 displays a map image according to the map data input from the map data input element 13. Further, the display element 17 displays a current position mark of the vehicle and a guiding route, which are overlapped over the map image. The current position mark of the vehicle represents a current position detected by the position detection element 11.

The control circuit 19 has a construction similar to a conventional micro computer. The control circuit 19 includes a CPU 19a, a ROM 19b, a RAM 19c, a I/O element and a bus line for coupling among these elements. The CPU 19a executes various process based on a signal (or information) input from the position detection element 11, the map data input element 13 and the operation element 15 according to a program stored in the ROM 19b.

Specifically, the control circuit 19 reads out the map data in each mesh from the map data input element 13 when the program is executed by the CPU 19a. Then, the map data is developed (i.e., converted and input) into the RAM 19c. Based on the map data, a map display process, a route search process, a route guide process and the like are executed.

(Read Out Map Data)

Figure 11:
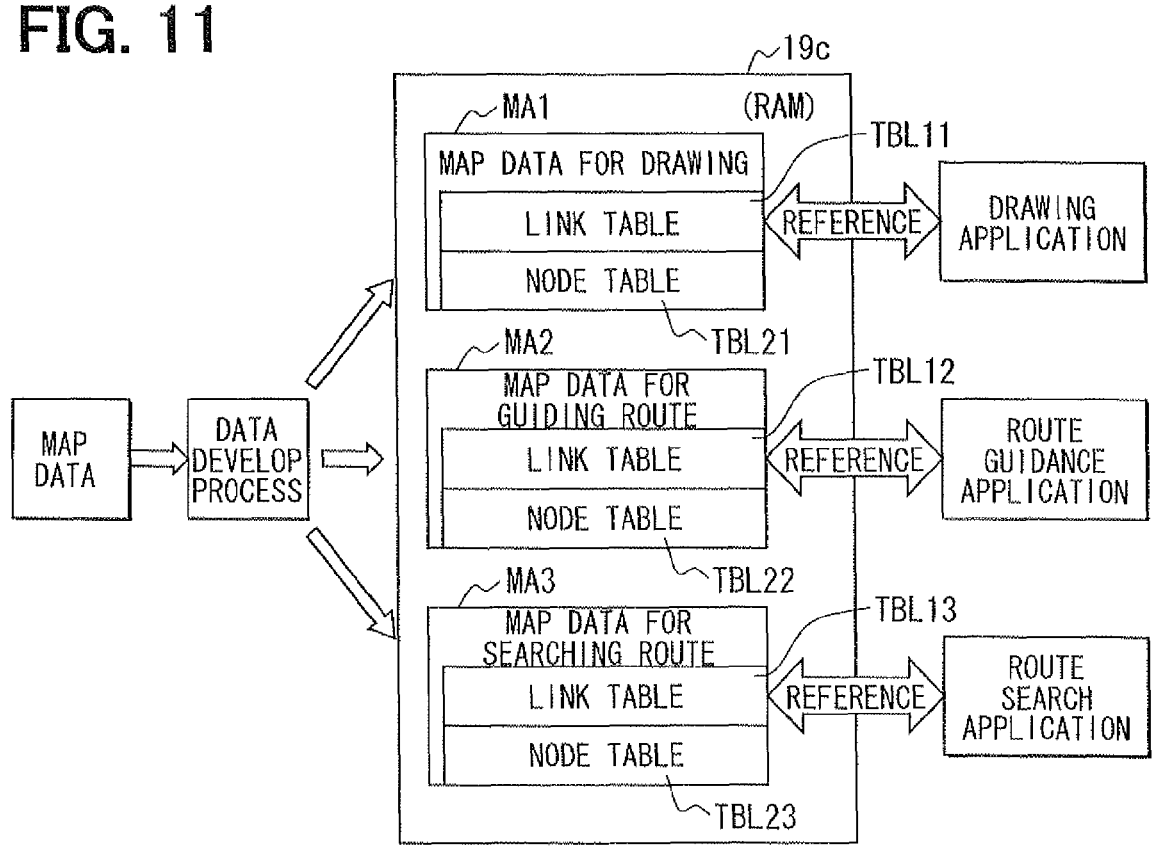
FIG. 11 is a diagram showing a method for developing the map data with a control circuit 19.

A step of reading out the map data from the map data input element 13 by the control circuit 19 and a step of inputting the map data into the RAM 19c will be explained. The control circuit 19 reads out the map data in each mesh from the map data input element 13, and then, inputs the map data into the RAM 19c. In this case, as shown in FIG. 11, the original map data stored in the map data input element 13 is converted into special map data MA1-MA3 corresponding to application programs, which refers the map data. The special map data MA1-MA3 in each application program is input into the RAM 19c. Then, the RAM 19c stores the special map data MA1-MA3 as the map data.

The application programs includes a drawing application program for executing a process of drawing the map image on the screen of the display element 17, a route search application program for executing a process of searching a guiding route to a destination, which is input by the user via the operation element 15, a route guidance application program for executing a process of guiding a route around a road, on which the vehicle is running, and the like. Here, the route guide includes a guidance of the route, a guidance of traffic control of a road in front of the vehicle, and a guidance of a traffic lane. The information for executing various application programs and the special map data MA1-MA3 retrieved and organized from the original map data stored in the map data input element 13 are stored in the RAM 19c.

The special map data referred for the drawing application program is defined as the drawing map data MA1. The special map data referred for the route search application program is defined as the route search map data MA3. The special map data referred for the route guidance application program is defined as the route guidance map data MA2.

The control circuit 19 executes a program for reading out the map data from the map data input element 13 and inputting the map data into the RAM 19c in addition to the drawing application program, the route search application program and the route guidance application program, which are stored in the ROM 19b, so that the control circuit 19 provides a function of the navigation device 10.

The drawing map data MA1 provides sufficient and necessary information for displaying the map image on the screen of the display element 17. The route search map data MA3 provides sufficient and necessary information for searching a guidance route to the destination. The route guidance map data MA2 provides sufficient and necessary information for guiding a route of the road with using the display element 17 and the audio output element 16.

Specifically, the special map data MA1-MA3 corresponding to each application program and each mesh mainly includes a link table and a node table. The information relating to the links in a corresponding mesh is arranged in the link table. The information relating to the nodes as connection points of the links is arranged in the node table.

Each link table TBL11-TBL13 includes "link data" in each link of the mesh. Multiple types of data relating to one link are organized in the "link data." Each node table TBL21-TBL23 includes "node data" in each node of the mesh. Identification information of the links connected to one node is organized in the "node data."

Specifically, when the map data stored in the map data input element 13 is input into the RAM 19c, the link table TBL11-TBL13 is formed such that information relating to link itself is organized in each link, and the node table TBL21-TBL23 is formed such that information about the node such as existence of a traffic signal and information of the connection relationship of the links are organized in each node. Here, the connection relationship of the links in the map data is described in each link.

(Link Table and Node Table)

The link table TBL13 and the node table TBL23 for providing the route search map data MA3 have a data structure shown in FIG. 12A, for example.

The link table TBL11-TBL13 includes the link data in each link of the mesh, and the link data provides the link detail attribution information, in which the link number and the detail attribution of the link are described. Specifically, as shown in FIG. 12A, the information about the link number, the link type, the link length, the speed limit and the one way regulation is described as the link attribution information in the link data, and the link data is registered in the route search link table TBL13.

The link number described in the link data shows the arrangement number of the corresponding link, which is registered in the link list Lb2. The link type described in the link data is derived from the link type stored in the corresponding link record. Similarly, the link length described in the link data is derived from the link length stored in the corresponding link record.

The information of the one way traffic regulation described in the link data is derived from the link direction attribution in the corresponding link record. Further, the speed limit described in the link data is derived from the speed category stored in the corresponding link record or the forward direction speed limit and the reverse direction speed limit, which are shown in the speed limit data control record of the corresponding link. In general, the forward direction speed limit and the reverse direction speed limit shown in the speed limit data control record of the corresponding link are described as the speed limit, together with information of a direction of a traffic lane to which the speed limit is applied, in the link data. When there is no speed limit data control record of the corresponding link, a value based on the speed range shown in the speed category is described as the speed limit. For example, the representing value of the speed range is described as the speed limit.

The node tables TBL21-TBL23 includes the node data in each node of the same mesh. The node data includes the node number, the number of connection links at the subject node, the link connection information in which the link numbers of the links connected to the subject node are arranged, the node coordinate information showing the coordinates of the subject node, and the node detail attribution information in which the detail attribution of the node other than the coordinates and the connection relationship is described.

Specifically, the node number is attached to the node data such that the node numbers are sequentially assigned in an order of registration in the node tables TBL21-TBL23. The number of link connections described in the node data corresponds to the number of links, of which the link numbers are registered in the link connection information. The link connection information includes a group of link numbers of each subject link connected to the corresponding node. The link numbers in the link connection information coincides with the arrangement number of the link list L132 of the corresponding link.

As shown in FIG. 12A, in the route search node table TBL-23, the right/left turn traffic regulation information, which is necessary to search the route, is described as the node detail attribution information. The right/left turn traffic regulation information includes the link number of the link reaching the subject node, at which the vehicle is prohibited from turning right and/or left. Further, the right/left turn traffic regulation information further includes the prohibited matter such as right-turn prohibition, left-turn prohibition and right and left turn prohibition.

The link connection information for providing the node data is derived from the starting point connection link number, the ending point connection link number, the starting point connection attribution and the ending point connection attribution, which are shown in the link record of each link coupled with the subject node. The node coordinate information is derived from the coordinate record of the subject node. The right/left turn traffic regulation information is derived from the combined link data control record of each link connected to the subject link.

FIG. 12B shows the data structure of the link table TBL12 and the node table TBL-22 for providing the route guidance map data MA2. AS shown in FIG. 12B, the link data registered with the route guidance link table TBL12 includes the link type and the number of traffic lanes as the link detail attribution information. The number of traffic lanes described as the link detail attribution information is derived from the number of traffic lanes shown in the corresponding link record. The node data registered in the route guidance node table TBL22. The node data includes the traffic signal information as the node detail attribution information. The traffic signal information is used for guiding that there is the traffic signal in front of the vehicle. The traffic signal information shows existence and non-existence of the traffic light, i.e., traffic signal, as the subject node. The traffic signal information is derived from the flag for showing existence of the traffic signal at the starting point side of the link and the flag for showing existence of the traffic signal at the ending point side of the link, which are described in each link record of a group of links connected to the subject node.

Although not shown in the drawings, the link table TBL11 of the drawing map data MA1 may be a link table including information of only the link type as the link detail attribution information. Further, the node table TBL21 of the drawing map data MA1 may be the same node table as the node table TBL22.

(Table Preparation Process)

Figure 13:
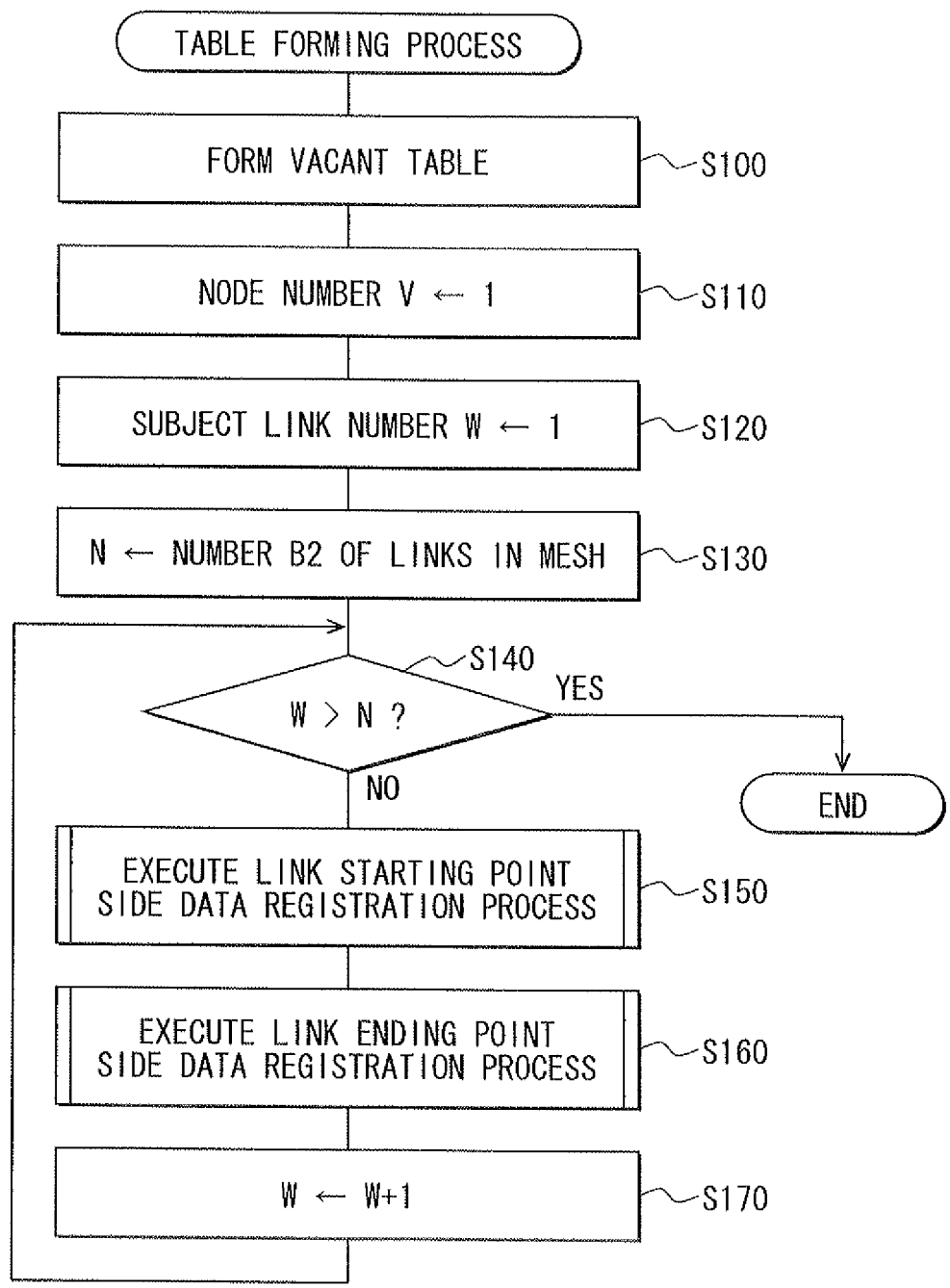
FIG. 13 is a flow chart showing a table creating process executed by the control circuit.

A table forming process as the table preparation process will be explained with reference to FIG. 13. The table forming process is executed when the node tables TBL21-TBL23 and the link tables TBL11-TBL13 are formed in each mesh and each application program by the control circuit 19 based on the map data of the map data input element 13. FIG. 13 shows a flowchart showing the table forming process executed by the control circuit 19. The control circuit 19 executes the table forming process in each mesh when the map data is read out. Thus, the node tables TBL21-TBL23 and the link tables TBL11-TBL13 corresponding to the subject mesh are formed in each application program.

When the table forming process starts, the control circuit 19 announces to form the table. In step S100, the circuit 19 the link tables TBL11-TBL13 and the node tables TBL21-TBL23 in each application program of a corresponding mesh are formed in the RAM 19c, and each of the link tables TBL11-TBL13 and the node tables TBL21-TBL23 is a vacant table so that a content of each table TBL11-TBL13 and TBL21-TBL23 is vacant. Then, in step S110, the node number V is initialized to be 1 so that the node numbers in each node data are assigned to positive integers starting from 1, and the node data is registered in the node tables TBL21-TBL23. In step S120, the link number W of the subject link is initialized to be 1. In the table forming process, the link record is referenced from the top of the link list Lb2 in turn. The link number W of the subject link shows the arrangement number of the link record from the top of the link list Lb2. The subject link corresponds to the link record of the subject link number W.

After step S120, the circuit 19 sets the number B2 of link records of the mesh as a map data reading-out object to be a variable number N in step S130. The number 82 of the link records is set according to the link record number B2 described in the mesh unit data of the road data. Here, the value put on the variable number N is defined as a value N.

After the step S130, the circuit 19 determines whether the subject link number W is larger than the value N in step S140. When the circuit determines that the subject link number W is equal to or smaller than the value N, when the determination in step S140 is "NO," the link starting point side data registration process in step S150 and the link ending point side data registration process in step S160 are executed.

In the link starting point side data registration process in step S150, the node data of the node, which is disposed at the starting point of the subject link, in each application program is formed. The node data is registered in the node tables TBL21-TBL23 of each application program. Further, the link data of each link connected to the subject node is formed in each application program. The link data is registered in the link table TBL11-TBL13 of each application program.

In the link ending point side data registration process in step S160, the node data of the node, which is disposed at the ending point of the subject link, in each application program is formed. The node data is registered in the node tables TBL21-TBL23 of each application program. Further, the link data of each link connected to the subject node is formed in each application program. The link data is registered in the link table TBL11-TBL13 of each application program.

Thus, the link starting point side data registration process in step S150 and the link ending point side data registration process in step S160 are completed, and then, in step S170, the circuit 19 adds 1 to the subject link number W, i.e., the subject link number W is updated to W+1. It returns to step S140, and then, steps S140 to S170 are repeated based on an updated subject link number W. In step S140, when the subject link number W exceeds the value N, i.e., when the determination of step S140 is "YES," the table forming process ends.

Figure 14:
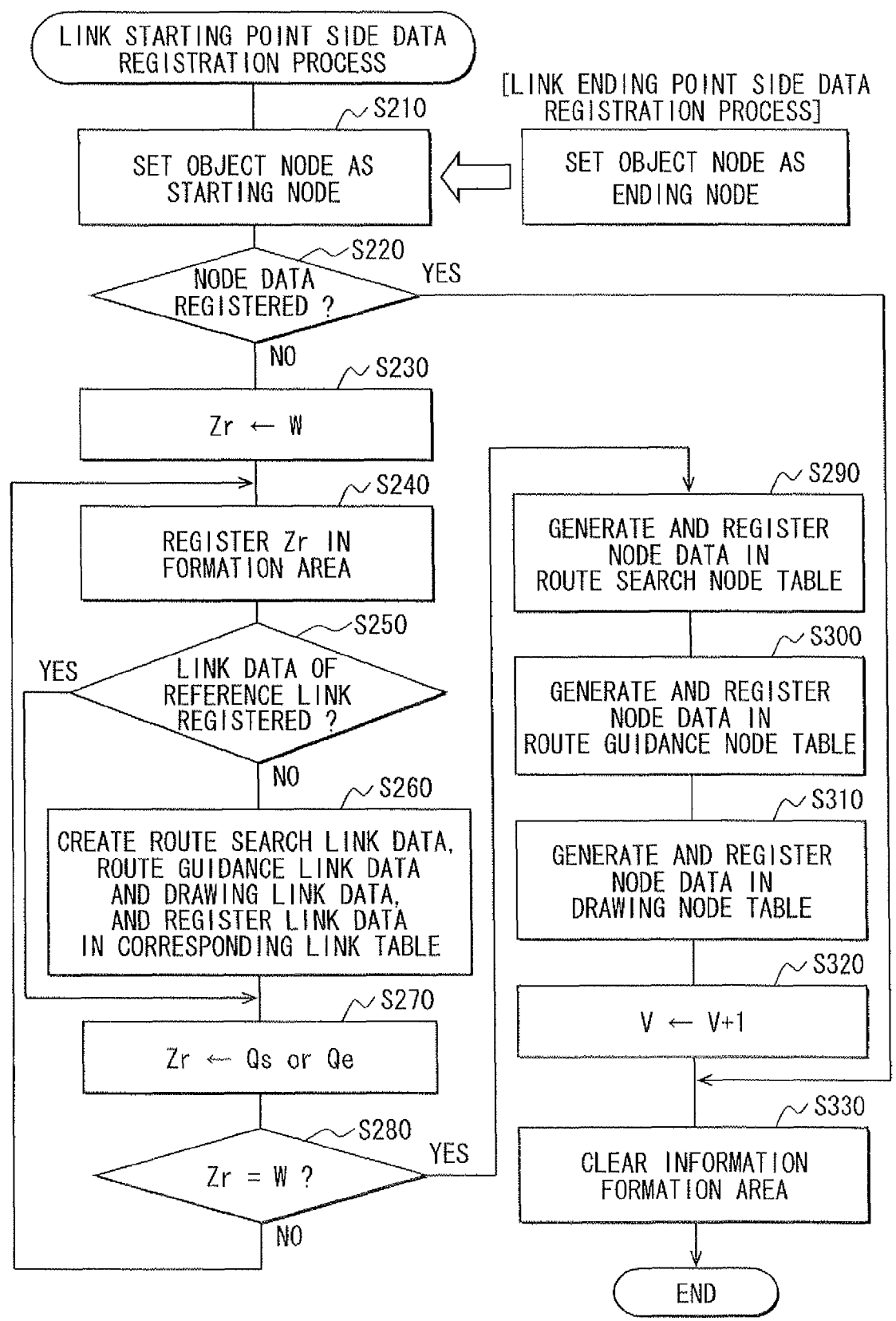
FIG. 14 is a flow chart showing a data registering process of a link starting point executed by the control circuit.

The link starting point side data registration process in step S150 will be explained with reference to FIG. 14. When the circuit 19 starts to execute the link starting point side data registration process, the circuit 19 sets the node disposed at the stating point of the subject link as an object node of registration of the node data in step S210. Here, the node coordinates of the node disposed at the starting point of the subject link are registered in a node coordinate information formation area of the RAM 19c. The object node of registration of the node data is set to be a node disposed at the starting point of the subject link. Here, the node coordinates can be specified based on the coordinate information described in the top record of the group of coordinate records associated with the link record of the subject link.

After step S210, the circuit 19 determines whether the node data of the node set as the node data registration object has been registered in the node table TBL21-TBL23 of each application program in step S220. When the node data is registered in the node table TBL21-TBL23, i.e., when the determination of step S210 is "YES," it goes to step S330. When the node data is not registered in the node table TBL21-TBL23, i.e., when the determination of step S210 is "NO," it goes to step S230.

In step S230, the circuit 19 sets the reference link number Zr to be the subject link number W, so that the reference link, of which the link record is referred to, is set to the subject link. In the map data structure according to the present embodiment, to obtain the connection relationship of the link corresponding to the node, it is necessary to refer the link records of the links connected to the same node in clockwise manner. In step S230, when the link records of the links connected to the same node are referred in turn, the first link record to be referred to is set in step S230.

After step S230, the circuit 19 proceeds to step S240. In step S240, the reference link number Zr is additionally registered in the link connection information formation area of the RAM 19c. Thus, the link number of the reference link connected to the node data registration object node is registered as the link connection information.

After step S240, the circuit 19 determines in step S250 whether the link data of the reference link corresponding to the reference link number Zr in each application program has been registered in the link table TBL11-TBL13. When the circuit 19 determines that the link data of the reference link is not registered in the link table TBL11-TBL13, i.e., when the determination of step S250 is "NO," it goes to step S260, and after step S260 is executed, it goes to step S270. When the circuit 19 determines that the link data of the reference link is registered in the link table TBL11-TBL13, i.e., when the determination of step S250 is "YES," it goes to step S270 directly without executing step S260.

Specifically, in step S260, the link record of the link number corresponding to the reference link number Zr is referred in the link list Lb2. Based on the referred link record and related records such as the speed limit data control record, the link data in each application program with reference to the reference link is formed. Specifically, the information provided by the link record of the reference link is organized, so that the link data to be registered in the route search link table TBL13, the link data to be registered in the route guidance link table TBL12 and the link data to be registered in the drawing link table TBL11 are formed. The link data corresponding to each link table TBL11-TBL13 is shown in FIGS. 12A, 12B and the like. Each of the link data in each application program is registered in the link table TBL11-TBL13, respectively.

In step S270, the reference link number Zr is updated. Specifically, one of the starting point connection link number Qs or the ending point connection link number Qe described in the link record of the reference link corresponding to the reference link number Zr at the present time is set to be a new reference link number Zr. Thus, the reference link number Zr is updated to one of the starting point connection link number Qs or the ending point connection link number Qe. Specifically, when the starting point of the current reference link coincides with the node data registration object node set in step S210, the reference link number Zr is updated to the starting point connection link number Qs described in the link record of the current reference link. When the ending point of the current reference link coincides with the node data registration object node set in step S210, the reference link number Zr is updated to the ending point connection link number Qe described in the link record of the current reference link. Here, when step S270 is firstly performed in the link starting point side data registration process, the reference link number Zr is updated to the starting point connection link number Qs described in the link record of the subject reference link at that time since the node disposed at the starting point of the subject link in step S210 is set to be the node data registration object node. It is specified by comparing the coordinates of each of the starting point and the ending point whether the starting point or the ending point of the reference link is the node data registration object node.

After step S270, the control circuit 19 goes to step S280. In step S280, it is determined whether the reference link number Zr coincides with the subject link number W. Here, when the reference link number Zr coincides with the subject link number W, the link records corresponding to the links coupled with the node are completely referenced in clockwise manner.

It is determined that the reference link number Zr does not coincide with the subject link number W, i.e., when the determination in step S280 is "NO," it returns to step S240 as the top of the routine loop. Then, steps S240 to S280 regarding the reference link corresponding to the updated reference link number Zr are executed.

Thus, when the above loop is repeatedly performed, the link numbers of the links coupled with the node data registration object node are registered in turn in the link connection information formation area. Finally, the link connection information regarding the subject node is completed. Further, in step S280, it is determined that the reference link number Zr coincides with the subject link number, i.e., when the determination of step S280 is "YES," the circuit 19 proceeds to step S290. In step S290, based on the link connection information generated in the link connection information formation area, the route search node data is formed. Then, the route search node data is registered in the route search node table TBL23.

Specifically, based on the link connection relationship of the subject node specified in the link connection information, the node detail attribution information stored in the route search node data is generated with reference to the map data stored in the map data input element 13. The node number V set at the present time, the number of links registered in the link connection information, the link connection information completed in the link connection information formation area, the node coordinate information registered in the node coordinate information formation area, and the node detail attribution information for the route search are provided by the node data. Then, the node data is registered with the route search node table TBL23.

Similarly, in step S290, the route guidance node data is registered in the route guidance node table TBL22. Specifically, based on the link connection relationship of the subject node specified in the link connection information, the node detail attribution information to be stored in the route guidance node data is generated. The node detail attribution information is replaced to the node detail attribution information stored in the route search node data so that the route guidance node data is formed. Then, the route guidance node data is registered in the route guidance node table TBL22.

In step S310 next to step S300, the drawing node data is registered in the drawing node table TBL21. Specifically, based on the link connection relationship of the subject node specified in the link connection information, the node detail attribution information to be stored in the drawing node data is generated. The node detail attribution information is replaced to the node detail attribution information stored in the route search node data so that the drawing guidance node data is formed. Then, the drawing node data is registered in the drawing node table TBL21.

After each node data of the subject node is registered in the respective node table TBL21-TBL23 of the application program, it proceeds to step S320. The node number V is counted up. Then, it goes to step S330.

In step S330, the information formation area, i.e., the link attribution information formation area and the node coordinate information formation area, in the RAM 19c, which is used for forming the node data, is cleared. Then, the link starting point side data registration process ends.

The link ending point side data registration process executed in step S160 is similar to the link starting point side data registration process. A difference between the link ending point side data registration process and the link starting point side data registration process is such that the node data registration object node is set to be the node disposed at the ending point of the subject link. In the present embodiment, the link ending point side data registration process is executed at step S160. The node data of the node disposed at the ending point of the subject link is registered in each of the node tables TBL21-TBL23.

Thus, the navigation device 10 is explained above. In the map data structure according to the present embodiment, the map data is compacted. Further, the link connection relationship is distributed and described in multiple link records. Thus, if the link connection relationship is specified with reference to the map data at each time on the navigation device side, the load for specifying the link connection relationship would be larger than a conventional art. Accordingly, in the present embodiment, the node data is formed from the map data, and then, the node data is registered in each of the node tables TBL21-TBL23. Thus, the load for specifying the link connection relationship in the present embodiment is reduced. Accordingly, in the navigation device 10, disadvantage of the compact map data is compensated.

In the navigation device 10, after the node tables TBL21-TBL23 are generated from the map data, the device 10 accesses the map data and executes a certain process in an application program. Thus, in the device 10 providing the above data structure, it is not necessary to modify a conventional application program largely, which is used conventionally.

Further, since the link table TBL11-TBL13 and the node table TBL21-TBL23 are formed in each application program, data accessibility is improved, and the process performance of the application program is improved.

Here, the link tables TBL11-TBL13 and the node tables TBL21-TBL23 for each application program are formed in series by single table forming process. The navigation device 10 may execute the table forming process for each application program in parallel to each other so that the link tables TBL11-TBL13 and the node tables TBL21-TBL23 for each application program are formed simultaneously.

For example, the table forming process is executed for each application program. In each table forming process of the application program, in step S260, only the link table for a corresponding application program is formed. In steps S290 to S310, only one of steps S290 to S310 is executed so that the node table corresponding to the link table is formed.

Specifically, according to the request from the application program, specifically, according to the request from a certain task for executing a process corresponding to the application program, the table forming process corresponding to the application program outputting the request is executed, so that the link table and the node table for the application program are generated. In this case, the memory region for the link table and the node table is reduced. Thus, convenience of the navigation device 10 is improved.

For example, the device 10 generates the drawing link table TBL11 and the drawing node table TBL21 according to the request from the drawing application program. The device 10 generates the route guidance link table TBL12 and the route guidance node table TBL22 according to the request from the route guidance application program. The device 10 generates the route search link table TBL13 and the route search node table TBL23 according to the request from the route search application program.

In the above embodiment, the link table TBL11-TBL13 and the node table TBL221-TBL23 are formed for each application program. Alternatively, the link table TBL11-TBL13 and the node table. TBL21-TBL23 may be formed commonly for multiple application programs. In this case, the memory region of the link table and the node table is reduced.

Alternatively, although the link table and the node table are formed for each application program, information commonly used for the application programs may be stored in a common link table and a common node table for multiple application programs. In this case, without reducing the read-out efficiency of the information relating to the link and the node, the memory area is reduced.

(Modifications)

A modification of the device 10 will be explained with reference to FIGS. 15 to 17. The navigation device 10 has the same construction of hardware as the device in FIG. 10. A part of contents of the table forming process executed by the circuit 19 and a part of the node table formed in the table forming process are different.

The navigation device 10 generates a common node table TBL30 for storing information, which is common among the node tables TBL21-TBL23. Further, the device 10 generates the tables TBL31-TBL33 for the application programs. The tables TBL31-TBL33 are prepared such that the commonly owned information other than the node number is deleted from the node tables TBL21-TBL23.

Figure 15:
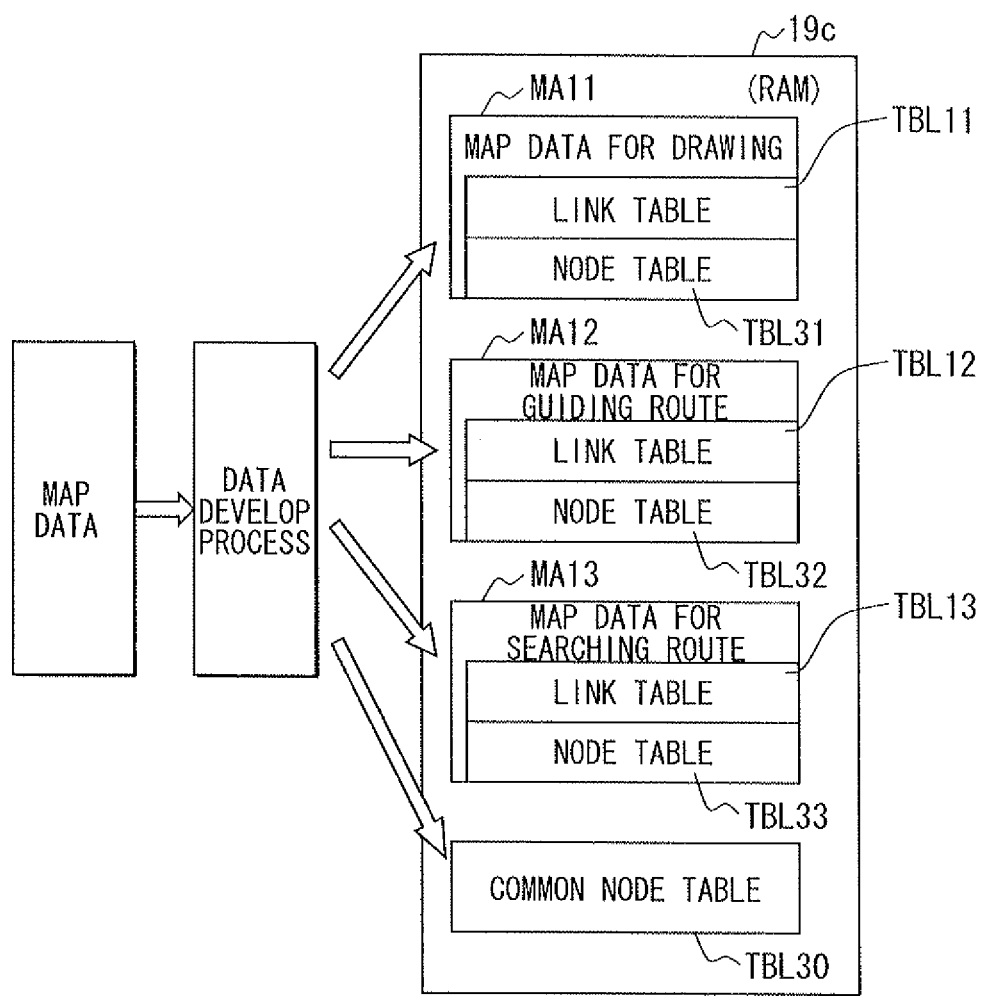
FIG. 15 is a diagram showing a method for developing the map data with a control circuit according to a modification of an example embodiment.

Specifically, as shown in FIG. 15, the control circuit 19 in the navigation device 10 according to the modification of the example embodiment generates the dedicated map data MA11-MA13 which stores the link tables TBL11-TBL13 and the node tables TBL31-TBL33 in the application programs when the circuit 19 reads out the map data in a corresponding mesh from the map data input element 13 and inputs the map data in the RAM 19c. Further, the circuit 19 generates the common node table TBL30 as common contents of the application programs.

FIG. 16A shows a data structure of the common node table TBL30, FIG. 16B shows a data structure of the node table TBL33 stored in the route search map data MA13. FIG. 16C shows a data structure of the node table TBL32 stored in the route guidance map data MA12.

As shown in FIG. 16A, the common node table TBL30 includes the node data in each node. The node data has the node number, the number of links connected at the node, the link connection information in which the link numbers of the links connected to the node are arranged, and the node coordinate information showing the node coordinates of the node, which are associated with each other. In view of FIG. 12, the information is commonly owned in the node tables TBL21-TBL23 in the above example embodiment.

As shown in FIGS. 16B and 16C, the node table TBL31-TBL33 for each application program includes the node data in each node, which includes the node detail attribution information associated with the node number. The node detail attribution information is specific to a corresponding application program. Specifically, comparing with FIG. 12, the node table TBL31-TBL33 for each application program is prepared by deleting the common information among the node tables TBL21-TBL23, and the common information includes the number of links connected to the node, the link connection information, and the node coordinate information. In the modification, the common table is formed in only the node table. Specifically, a common link table is not formed, so that the link tables TBL11-TBL13 are the same as in FIGS. 12A and 12B.

In step S100 of the table forming process, the circuit 19 announces to form a table, as shown in FIG. 13. The common node table TBL30, the link tables TBL11-TBL13 and the node tables TBL31-TBL33 for each application program of a corresponding mesh are formed in the RAM 19c, and each of the common node table TBL30, the link tables TBL11-TBL13 and the node tables TBL31-TBL33 is a vacant table so that a content of each table TBL30, TBL11-TBL13 and TBL21-TBL23 is vacant. Then, steps S110-S170 are executed similarly to the above example embodiment. However, in step S150, instead of the link starting point data registration process in FIG. 14, the link starting point data registration process in FIG. 17 is executed. In step S160, the link ending point data registration process is executed, so that the node data is registered in the common node table TBL30, the link tables TBL11-TBL13 and the node tables TBL31-TBL33 for the application programs, and then, the tables TBL30, TBL11-TBL13, TBL31-TBL33 are completed.

Figure 17:
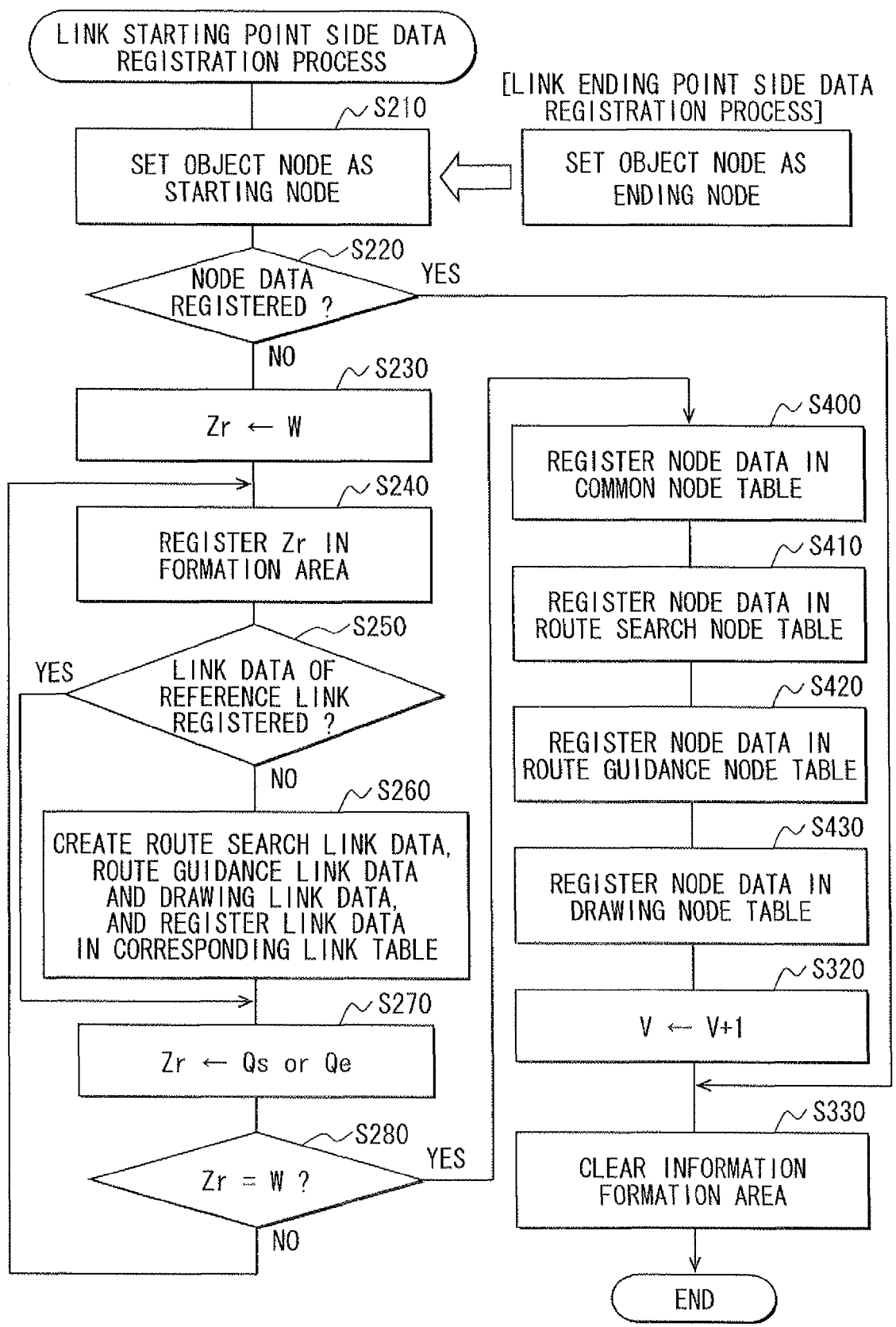
FIG. 17 is a flow chart showing a data registering process of a link starting point executed by the control circuit according to a modification of the example embodiment.

Specifically, in the link starting point data registration process in FIG. 17, steps S210-S280 are executed. Then, it goes to step S400. In step S400, the node number, the number of links coupled with the node, the link connection information and the node coordinate information corresponding to the node data registration object node are stored in the node data, and then, the node data is registered in the common node table TBL30.

Based on the link connection relationship of the subject node, which is specified in the link connection information of the node data registration object node, the node detail attribution information stored in the route search node data is generated in view of the map data stored in the map data input element 13. The node data storing the node number and the node detail attribution information of the subject node is registered in the route search node table TBL33 in step S410.

Further, based on the link connection relationship of the subject node, which is specified in the link connection information of the node data registration object node, the node detail attribution information stored in the route guidance node data is generated in view of the map data stored in the map data input element 13. The node data storing the node number and the node detail attribution information of the subject node is registered in the route guidance node table TBL32 in step S420.

Further, based on the link connection relationship of the subject node, which is specified in the link connection information of the node data registration object node, the node detail attribution information stored in the drawing node data is generated in view of the map data stored in the map data input element 13. The node data storing the node number and the node detail attribution information of the subject node is registered in the drawing node table TBL31 in step S430.

Thus, after the node data of the node data registration object node is registered in each node table TBL31-TBL33 for a corresponding program, it proceeds to step S320. In step S320, the node number V is count up by one count. Then, it goes to step S330.

In the modification, the above link starting point side data registration process is executed. Further, in the link ending point side data registration process, the node data registration object node is set to be the node at the ending point of the subject link. The link ending point side data registration process is executed similarly to the link starting point side data registration process in FIG. 17. Thus, the node data of the node disposed at the ending point of the subject link is registered in the common node table TBL30, and the node tables TBL31-TBL33 for application programs.

In the modification, the common node table TBL30 and the node tables TBL31-TBL33 for application programs are completed.

When the node data for each program is referenced, the node data of the common node table TBL30 and the node data of the corresponding node table are referenced since the node data of the common node table TBL30 and the node data of the corresponding node table are associated with the node number. Thus, the application program is executed according to the node data.

In the navigation device 10 according to the modification of the example embodiment, information relating to the node in the node tables, which is commonly used for the application programs and includes the link connection information, is stored in the common node table. TBL30. Specifically, the information about the number of links coupled with the node, the link connection information and the node coordinate information is stored in the common node table TBL30. The node tables TBL31-TBL33 for the programs store the information of the node for application programs other than the information in the common node table. Accordingly, in the modification, the data amount of the node tables is reduced, so that the reading efficiency of the node data is improved. Further, the memory region for storing the node table is reduced effectively. Although a common link table is not generated in the modification, the common link table may be generated by retrieving information, which is common among the link tables TBL11-TBL13.

In the above embodiment, the above data structure may be used for a device other than the navigation device. Specifically, the map data installed in a mobile terminal such as a cell phone may have the above data structure.

In the above embodiment, the link number of the link adjacent to the subject link in a clockwise manner and coupled with the subject link is described as the starting point connection link number or the ending point connection link number. Alternatively, the link number of the link adjacent to the subject link in a counter-clockwise manner may be described as the starting point connection link number or the ending point connection link number.

The connection link number, i.e., the starting point connection link number and the ending point connection link number, may be the link number of the link coupled with the same point in a descending order or an ascending order of the link number so that the link connection relationship is described. For example, as shown in FIG. 6A, when the link numbers of the links L0-L3 have a relationship of link number L2>link number L1>link number L3>link number L0, the link number of the link L3 is described in the connection link number of the link record of the link L0, the link number of the link L2 is described in the connection link number of the link record of the link L1, and the link number of the link L0 is described in the connection link number of the link L2.

With using the connection link number, when all of the link records of multiple links coupled with the same node are effectively referenced based on the connection link number, so that the link connection relationship of the subject node is obtained. Specifically, when the connection link number is described in the descending order of the link number, the device 10 can access the link record of the link coupled with the same point in an order from a top of the link list Lb2.

In the present embodiment, the map data stored in a memory medium is converted to the link table TBL11-TBL13 and the node table TBL21-TBL23 (or node table TBL31-TBL33), and then, the converted map data is written in a work memory as an operation memory. When the map data is read out, the map data input element 13 copies the map data stored in the memory medium in the RAM 19c. Based on the copied map data, the link table TBL11-TBL13 and the node table TBL21-TBL23 (or node table TBL31-TBL33) are formed. Then, the link table TBL11-TBL13 and the node table TBL21-TBL23 (or node table TBL31-TBL33) are stored in another region of the RAM 19c, to which the application program refers.

The map data memory means corresponds to the region of the RAM 19c in which the map data stored in the memory medium of the map data input element 13 is stored. The work memory corresponds to the region of the RAM 19c in which the link table and the node table are stored.

The attribution data relating to the attribution information of the link and both ends of the link includes the information as the attribution of the link such as the link length and the number of lanes. Further, the attribution data includes the information as the attribution of both ends of the link such as the link record including the starting point/ending point connection link number and existence of the traffic light, the speed limit data control record, the combined link regulation record and the like.

The above disclosure has the following aspects.

According to an aspect of the present disclosure, an electric device for executing a process based on a map data includes: a map data memory for storing the map data; a work memory; and a CPU for reading out the map data from the map data memory and for developing the map data into the work memory. The CPU executes the process based on the developed map data in the work memory. The map data in the map data memory provides a road network, which is defined by a plurality of unit links and a plurality of link connection relationships. Each link represents a part of a road. Each link connection relationship represents a connection between links at a connection point. The map data includes an attribution data in each link. The attribution data provides attribution of a corresponding link and attribution of an end of the corresponding link. The attribution of the end includes connection relationship information of the corresponding link at the end. The CPU generates a node table according to the attribution data. The node table stores a link connection information in each node as the connection point coupled with a plurality of links. The link connection information provides identification of the plurality of links, which are coupled with each other at a corresponding node. The CPU writes the node table as the developed map data into the work memory.

In the above device, when the map data is developed in the work memory, the CPU generates the link connection information showing the link connection relationship at a corresponding node, and generates the node table storing the link connection information. Accordingly, even if the map data does not include the node data, and the link connection information is distributed and described in the attribution data of each link, the CPU can specify the link connection relationship at each node according to the node table. Thus, since the CPU references the node table, a process load for the node is limited. Thus, even when the map data is compacted, the process performance relating to the node is improved.

Alternatively, the connection relationship information of a corresponding link at the end of the corresponding link shows only one link as a connection object link selected in a group of other links, which are coupled with the end of the corresponding link. Thus, when the link connection relationship information is stored in the attribution data of each link, it is necessary to reference the attribution data of each link, which is coupled with each other, for obtaining the connection relationship at the node. Thus, although the data size of the map data is reduced, a step for obtaining the connection relationship at the node is necessary. Accordingly, when the step for forming the node table is added, the process load for obtaining the information about the node is reduced effectively.

The navigation device includes multiple application programs, which references the map data. The application programs includes a drawing program for drawing a map image on a display device, a route search program for searching a guidance route to a destination, a route guidance program for guiding a road such as guiding the route to the destination, guiding a traffic regulations in front of the vehicle (for example, a temporally stop and right/left turn prohibition), and guiding a traffic lane such as a right turning lane or a left turning lane. The navigation device executes independently each application program. Accordingly, when the map data is developed into the work memory, the map data is developed (i.e., converted) to data for each application program. For example, the node table is formed such that the sufficient and necessary information with respect to a corresponding application program is stored in the node table. Specifically, the attribution of the link and the attribution of the end of the link include information about roads and intersections such as existence of a traffic light, traffic regulations and the like in addition to the link connection relationship. However, when the drawing process is executed, it may be not necessary to provide the information about the traffic regulation such as right/left turn prohibition. Thus, according to the application program, unnecessary information is not retrieved from the map data, but necessary information is retrieved from the map data, so that the node table is formed. In this case, the process efficiency of the application program is improved.

In view of the above point, the process may include a plurality of application programs. The CPU executes each application program based on the developed map data in the work memory. The node table includes a plurality of special node tables, each of which corresponds to a respective application program. The CPU generates each special node table as a part of the developed map data, and writes the special node table in the work memory. Each special node table includes information about each node, which is available for a corresponding application program. The information about a corresponding node includes the link connection information. In this case, when the node table is formed in each application program, in the process of the application program, necessary information relating to the node is obtained, so that the process load is reduced.

Alternatively, the CPU may generate a plurality of special link tables according to the attribution data. Each special link table corresponds to a respective application program. Each link table stores a special link attribution in each link corresponding to a respective application program. The CPU retrieves information about each link, which is used for a corresponding application program, from the attribution of a corresponding link in the attribution data so that the special link attribution is generated. The CPU writes the plurality of special link tables and the plurality of special node tables as the developed map data into the work memory. In this case, since the CPU generates the link table and the node table for each program, in a process of the application program, necessary information relating to the link and the node is effectively obtained. Thus, the process load of the CPU is reduced.

Alternatively, each application program may include a task. The CPU generates one special link table and a corresponding special node table, which correspond to one application program, in response to request from a task in the one application program. In this case, the memory area in the work memory for the node table and the link table is reduced.

Alternatively, the process may include a plurality of application programs. The CPU executes each application program based on the developed map data in the work memory. The node table includes a common node table and a plurality of special node tables. The common node table includes information, which is commonly used for the plurality of application programs. Each special node table corresponds to a respective application program. The CPU generates each of the common node table and the plurality of special node tables as a part of the developed map data, and writes each of the common node table and the plurality of special node tables in the work memory. The common node table includes information about each node, which is commonly available for the plurality of application programs. The information about a corresponding node in the common node table includes the link connection information. Each special node table includes information about each node, which is available for a corresponding application program, other than the information about a corresponding node in the common node table. In this case, the memory area for storing the node table is reduced since the common node table is maintained in the device.

Alternatively, the CPU may generate a plurality of special link tables according to the attribution data. Each special link table corresponds to a respective application program. Each link table stores a special link attribution in each link corresponding to a respective application program. The CPU retrieves information about each link, which is used for a corresponding application program, from the attribution of a corresponding link in the attribution data so that the special link attribution is generated. The CPU writes the plurality of special link tables, the common node table and the plurality of special node tables as the developed map data into the work memory.

Further, each application program may include a task. The CPU generates one special link table and a corresponding special node table, which correspond to one application program, in response to request from a task in the one application program.

Alternatively, the link table and the node table are not formed in each application program, and common link table and a common node table may be formed. In this case, the memory region for storing the tables is reduced on a whole of the application programs.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. An electric device for executing a process based on a map data comprising:
    a map data memory for storing the map data;
    a work memory; and
    a CPU for reading out the map data from the map data memory and for developing the map data into the work memory as developed map data,
    the CPU is configured to
        execute the process based on the developed map data in the work memory,
            the map data in the map data memory provides a road network, which is defined by a plurality of unit links and a plurality of link connection relationships, the map data omits node data that describes nodes of the road network,
            each link represents a part of a road,
            each link connection relationship represents a connection between links at a connection point,
            the map data includes an attribution data in each link,
            the attribution data provides attribution of a corresponding link and attribution of an end of the corresponding link,
            the attribution of the end includes connection relationship information of the corresponding link at the end;
        generate a node table according to the attribution data, from the map data that omits the node data that describes nodes of the road network,
            the node table stores a link connection information in each node as the connection point coupled with a plurality of links,
            the link connection information provides identification of the plurality of links, which are coupled with each other at a corresponding node; and
        write the node table as the developed map data into the work memory.

2. The electric device according to claim 1,
    the connection relationship information of a corresponding link at the end of the corresponding link shows only one link as a connection object link selected in a group of other links, which are coupled with the end of the corresponding link.

3. The electric device according to claim 1,
the process further includes a plurality of application programs,
the CPU is further configured to:
execute each application program based on the developed map data in the work memory, the node table includes a plurality of special node tables, each of which corresponds to a respective application program; and
generate each special node table as a part of the developed map data, and write the special node table in the work memory,
- each special node table includes information about each node, which is available for a corresponding application program, and
- the information about a corresponding node includes the link connection information.

4. The electric device according to claim 3,
the CPU is further configured to:
generate a plurality of special link tables according to the attribution data,
- each special link table corresponds to a respective application program,
- each link table stores a special link attribution in each link corresponding to a respective application program;
retrieve information about each link, which is used for a corresponding application program, from the attribution of a corresponding link in the attribution data so that the special link attribution is generated; and
write the plurality of special link tables and the plurality of special node tables as the developed map data into the work memory.

5. The electric device according to claim 4,
each application program includes a task,
the CPU is further configured to generate one special link table and a corresponding special node table, which correspond to one application program, in response to request from a task in the one application program.

6. The electric device according to claim 1,
the process includes a plurality of application programs,
the CPU is further configured to:
execute each application program based on the developed map data in the work memory,
- the node table includes a common node table and a plurality of special node tables,
- the common node table includes information, which is commonly used for the plurality of application programs,
- each special node table corresponds to a respective application program; and
generate each of the common node table and the plurality of special node tables as a part of the developed map data, and writes each of the common node table and the plurality of special node tables in the work memory,
- the common node table includes information about each node, which is commonly available for the plurality of application programs,
- the information about a corresponding node in the common node table includes the link connection information, and
- each special node table includes information about each node, which is available for a corresponding application program, other than the information about a corresponding node in the common node table.

7. The electric device according to claim 6,
the CPU is further configured to:
generate a plurality of special link tables according to the attribution data,
- each special link table corresponds to a respective application program,
- each link table stores a special link attribution in each link corresponding to a respective application program;
retrieve information about each link, which is used for a corresponding application program, from the attribution of a corresponding link in the attribution data so that the special link attribution is generated; and
write the plurality of special link tables, the common node table and the plurality of special node tables as the developed map data into the work memory.

8. The electric device according to claim 7,
each application program further includes a task,
the CPU is further configured to generate one special link table and a corresponding special node table, which correspond to one application program, in response to request from a task in the one application program.

9. The electric device according to claim 1, the map data from which the CPU generates the node table includes no node data that describes the nodes of the road network.

\* \* \* \* \*